(12) United States Patent
Miyamoto

(10) Patent No.: US 10,213,004 B2
(45) Date of Patent: Feb. 26, 2019

(54) NAIL SHAPE ACQUIRING DEVICE, DRAWING APPARATUS, METHOD FOR CONTROLLING NAIL SHAPE ACQUIRING DEVICE, AND COMPUTER-READABLE RECORDING MEDIUM STORING PROGRAM FOR CONTROLLING NAIL SHAPE ACQUIRING DEVICE

(71) Applicant: CASIO COMPUTER CO., LTD., Shibuya-ku, Tokyo (JP)

(72) Inventor: Yuichi Miyamoto, Yokohama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 218 days.

(21) Appl. No.: 15/248,398

(22) Filed: Aug. 26, 2016

(65) Prior Publication Data
US 2017/0079402 A1 Mar. 23, 2017

(30) Foreign Application Priority Data
Sep. 18, 2015 (JP) ................. 2015-184558

(51) Int. Cl.
| G06K 9/46 | (2006.01) |
| A45D 29/22 | (2006.01) |
| G06K 9/52 | (2006.01) |
| G06K 9/62 | (2006.01) |
| G06K 9/00 | (2006.01) |
| G06T 11/20 | (2006.01) |
| G06T 7/64 | (2017.01) |
| B41J 3/407 | (2006.01) |
| G06K 9/32 | (2006.01) |

(Continued)

(52) U.S. Cl.
CPC .............. *A45D 29/22* (2013.01); *B41J 3/407* (2013.01); *G06K 9/00362* (2013.01); *G06K 9/32* (2013.01); *G06K 9/4652* (2013.01); *G06K 9/48* (2013.01); *G06K 9/52* (2013.01); *G06K 9/6215* (2013.01); *G06T 7/64* (2017.01); *G06T 11/20* (2013.01); *A45D 2029/005* (2013.01); *G06T 2207/30196* (2013.01)

(58) Field of Classification Search
CPC ........ G06K 9/4604; G06T 2207/30196; G06T 11/20; G06T 7/73; G06T 7/13
See application file for complete search history.

(56) References Cited

U.S. PATENT DOCUMENTS

| 8,814,289 B2 | 8/2014 | Yamasaki | |
| 2012/0274683 A1* | 11/2012 | Yamasaki | B41J 3/4073 347/2 |
| 2014/0183769 A1* | 7/2014 | Li | B29C 51/46 264/40.1 |

FOREIGN PATENT DOCUMENTS

JP  2012232414 A  11/2012

\* cited by examiner

*Primary Examiner* — Euengnan Yeh
(74) *Attorney, Agent, or Firm* — Holtz, Holtz & Volek PC

(57) ABSTRACT

A nail shape acquiring device has a control unit, which acquires a plurality of index values representing a degree of curve of a curved shape of a nail of each of a plurality of objects on the basis of at least one image in which the plurality of objects is imaged. The plurality of objects are a plurality of fingers, including at least one pair of same type fingers on right and left hands, or toes, including at least one pair of same type toes on right and left feet. A determination unit determines, on the basis of different index values for nails of the same type fingers or the same type toes, whether (Continued)

at least one of the index values is to be used as a value representing the degree of the curve of the curved shape of the nail.

15 Claims, 18 Drawing Sheets

(51) Int. Cl.
*G06K 9/48* (2006.01)
*A45D 29/00* (2006.01)

NAIL SHAPE ACQUIRING DEVICE, DRAWING APPARATUS, METHOD FOR CONTROLLING NAIL SHAPE ACQUIRING DEVICE, AND COMPUTER-READABLE RECORDING MEDIUM STORING PROGRAM FOR CONTROLLING NAIL SHAPE ACQUIRING DEVICE

CROSS-REFERENCE TO RELATED APPLICATIONS

This application is based upon and claims the benefit of priority from the prior Japanese Patent Application No. 2015-184558, filed Sep. 18, 2015, the entire contents of which are incorporated herein by reference.

BACKGROUND OF THE INVENTION

1. Field of the Invention

The present invention relates to a nail shape acquiring device, a drawing apparatus which includes the nail shape acquiring device, a method for controlling a nail shape acquiring device, and a computer-readable recording medium which stores a program for controlling a nail shape acquiring device.

2. Description of the Related Art

A printing apparatus configured to print a nail design on a fingernail or the like is conventionally known. Such a printing apparatus is described in Japanese Patent Application Laid-Open No. 2012-232414, for example.

In this printing apparatus, a curved shape of a nail in its width direction is acquired, and a nail design is corrected so as to conform to the acquired curved shape, and the corrected nail design is printed on the nail, thereby enabling appropriate printing of the design on the curved nail surface.

In the course of acquiring the curved shape in the width direction of a nail, there may occur a case where the curved shape is not acquired properly, for example because it is affected by a noise or by surface irregularities of the nail, because the position of acquiring the curved shape of the nail is inappropriate, or due to other various factors.

In such a case, if the nail design is corrected to conform to the acquired curved shape of the nail, not knowing that the curved shape was not acquired properly, and if the corrected nail design is printed on the nail, the printing may not be performed appropriately on the nail, leading to a failure in printing of the nail design on the nail.

Conventionally, it was not possible to appropriately determine whether the curved shape of a nail was acquired properly or not.

SUMMARY OF THE INVENTION

The present invention is advantageous in that it can provide a nail shape acquiring device, a drawing apparatus, and a method for controlling a nail shape acquiring device which enable appropriate determination as to whether the curved shape of a nail has been acquired properly or not, thereby suppressing a failure in printing of a nail design on the nail.

A first nail shape acquiring device according to an embodiment of the present invention has a control unit, and the control unit includes: an index value acquiring unit which acquires a plurality of index values representing a degree of curve of a curved shape of a nail of each of a plurality of objects on the basis of at least one image in which the plurality of objects is imaged, the plurality of objects being a plurality of fingers including at least one pair of same type fingers on right hand and left hand of one user or a plurality of toes including at least one pair of same type toes on right foot and left foot of one user; and a determination unit which determines, on the basis of a difference between the index values for the nails of the same type fingers on the right hand and left hand or the same type toes on the right foot and left foot, whether at least one of the index values is to be used as a value representing the degree of the curve of the curved shape of the nail corresponding to said at least one of the index values.

A second nail shape acquiring device according to an embodiment of the present invention has a control unit, and the control unit includes: an index value acquiring unit which acquires a plurality of index values representing a degree of curve of a curved shape of a nail of each of a plurality of objects on the basis of at least one image in which a plurality of objects is imaged, the plurality of objects being one of a plurality of fingers of a right hand, a plurality of fingers of a left hand, a plurality of toes of a right foot and a plurality of toes of a left foot; and a determination unit which determines whether the index value is to be used as a value representing the degree of the curve of the curved shape of the nail, on the basis of mutual comparison of the respective index values of the plurality of the objects.

A drawing apparatus according to an embodiment of the present invention includes: the first or second nail shape acquiring device described above; a drawing unit which performs drawing on the nails; and a drawing control unit which controls the drawing unit to draw, on the nail of each of the plurality of objects, a nail design which has been designated to be drawn on the nail of the object and which is corrected in accordance with the index value that has been determined to be used as the value representing the degree of the curve of the curved shape of the nail of the object.

A first method for controlling a nail shape acquiring device according to an embodiment of the present invention includes the steps of: acquiring a plurality of index values representing a degree of curve of a curved shape of a nail of each of a plurality of objects on the basis of at least one image in which a plurality of objects is imaged, the plurality of objects being a plurality of fingers including at least one pair of same type fingers on right hand and left hand of one user or a plurality of toes including at least one pair of same type toes on right foot and left foot of one user; and determining, on the basis of a difference between the index values for the nails of the same type fingers on the right hand and left hand or the same type toes on the right foot and left foot, whether at least one of the index values is to be used as a value representing the degree of the curve of the curved shape of the nail corresponding to said at least one of the index values.

A second method for controlling a nail shape acquiring device according to an embodiment of the present invention includes the steps of: acquiring a plurality of index values representing a degree of curve of a curved shape of a nail of each of a plurality of objects on the basis of at least one image in which the plurality of objects is imaged, the plurality of objects being one of a plurality of fingers of a right hand, a plurality of fingers of a left hand, a plurality of toes of a right foot and a plurality of toes of a left foot; and determining whether the index value is to be used as a value representing the degree of the curve of the curved shape of the nail, on the basis of mutual comparison of the respective index values of the plurality of the objects.

In a computer-readable recording medium storing a first program for controlling a nail shape acquiring device according to an embodiment of the present invention, the first control program causes a computer to perform the steps of: acquiring a plurality of index values representing a degree of curve of a curved shape of a nail of each of a plurality of objects on the basis of at least one image in which a plurality of objects is imaged, the plurality of objects being a plurality of fingers including at least one pair of same type fingers on right hand and left hand of one user or a plurality of toes including at least one pair of same type toes on right foot and left foot of one user as a plurality of objects; and determining, on the basis of a difference between the index values for the nails of the same type fingers on the right hand and left hand or the same type toes on the right foot and left foot, whether at least one of the index values is to be used as a value representing the degree of the curve of the curved shape of the nail corresponding to said at least one of the index values.

In a computer-readable recording medium storing a second program for controlling a nail shape acquiring device according to an embodiment of the present invention, the second control program causes a computer to perform the steps of: acquiring a plurality of index values representing a degree of curve of a curved shape of a nail of each of a plurality of objects on the basis of at least one image in which a plurality of objects is imaged, the plurality of objects being one of a plurality of fingers of a right hand, a plurality of fingers of a left hand, a plurality of toes of a right foot and a plurality of toes of a left foot; and determining whether at least one of the index values is to be used as a value representing the degree of the curve of the curved shape of the nail corresponding to said at least one of the index values, on the basis of mutual comparison of the respective index values of the plurality of the objects.

DETAILED DESCRIPTION OF THE INVENTION

Figure 1:
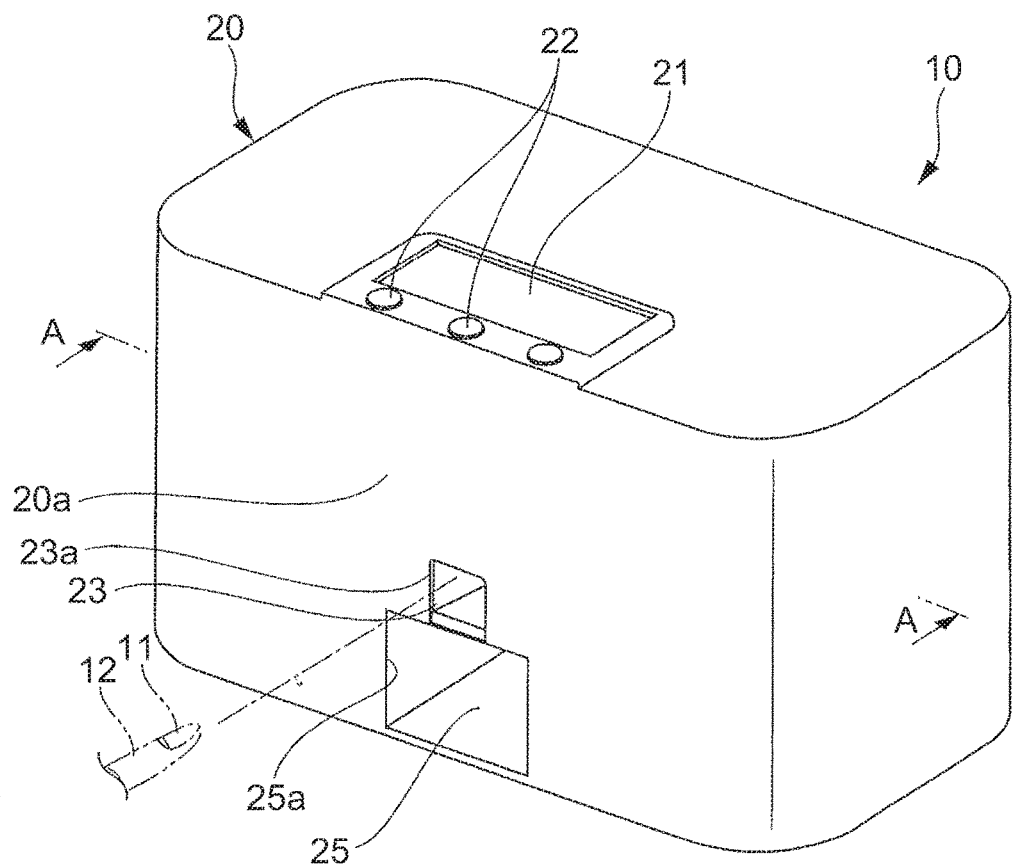
FIG. 1 is a perspective view showing an appearance of a drawing apparatus according to an embodiment of the present invention.

Embodiments of the present invention will be described in detail below with reference to the drawings.

Throughout the description of the embodiments, same elements are denoted by same numbers.

In the following embodiments, a description will be made assuming that a drawing apparatus performs drawing on surfaces of finger nails as drawing object surfaces. The drawing object surfaces in the present invention, however, are not limited to the surfaces of the finger nails; they may be, for example, surfaces of toe nails.

<Overall Configuration of Drawing Apparatus>

First, an overall configuration of a drawing apparatus 10, common to embodiments according to the present invention, will be described with reference to FIGS. 1 to 3.

As shown in FIG. 1, the drawing apparatus 10 is an apparatus which has a drawing function and is used to apply nail designs onto nails 11 of human fingers 12.

The drawing apparatus 10 includes a box-shaped casing 20, which has an upper surface (top board) on which a display unit 21 and an operation unit 22 are disposed.

An insertion opening 23a for a first finger insertion portion 23 opens at a lower center of a front section 20a of the casing 20 and, further, an insertion opening 25a for a second finger insertion portion 25 opens beneath the first finger insertion portion 23.

The second finger insertion portion 25 provides a space which is separated from (or, not communicating with) the inner space of the casing 20 and which is formed to extend backward in the insertion direction of the finger(s) 12 from the front section 20a of the casing 20, to receive the finger(s) 12 of a hand other than the finger 12 as a target of drawing.

It should be noted that the first finger insertion portion 23 has a size that can receive a single finger 12. The first finger insertion portion 23, however, is not limited to this size; it may have a size that can receive two or more fingers 12 at the same time.

Figure 2:
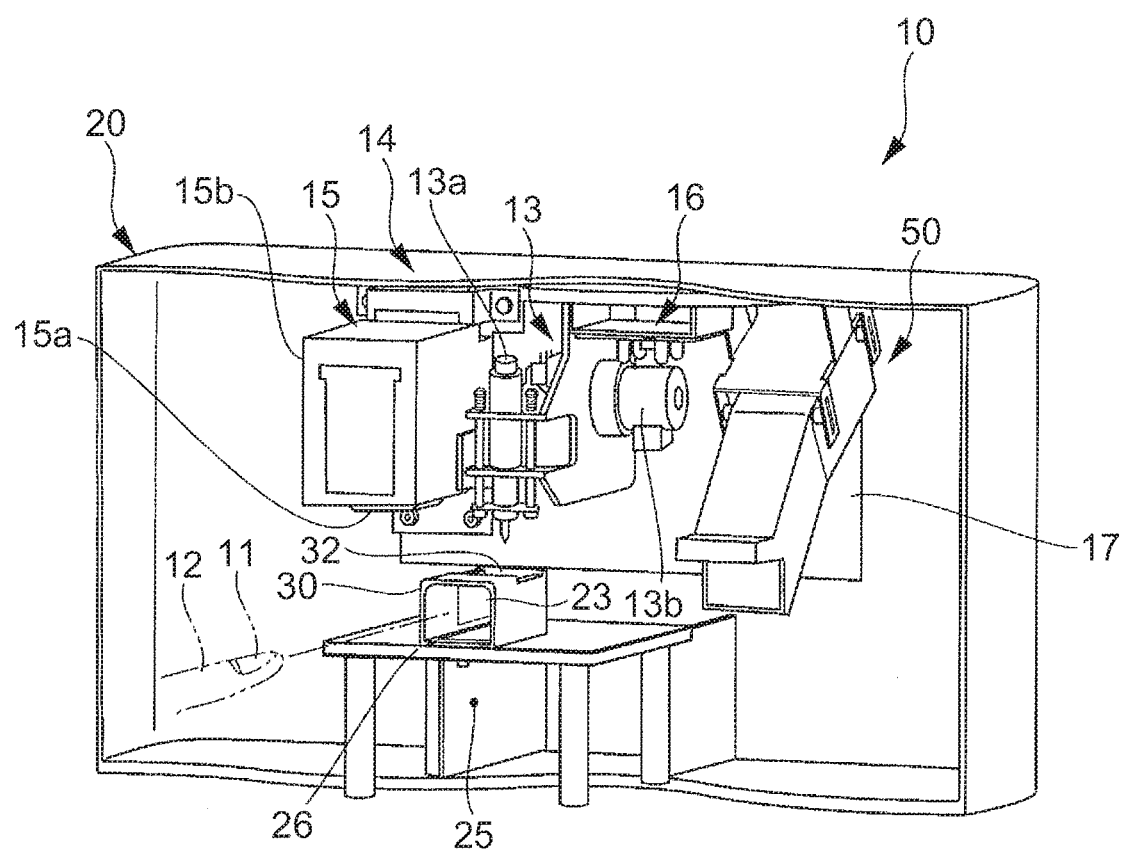
FIG. 2 is a view with the casing cut along the line A-A in FIG. 1.

As shown in FIG. 2, a finger placing table 26 is provided at the lower part inside the casing 20, and a finger holding case 30 is provided on an upper surface of the finger placing table 26.

The inner space of the finger holding case 30 is a space for forming the first finger insertion portion 23.

Inside the casing 20, a clamping plate 17 is provided in such a way as to be movable in the width direction and in the depth direction of the apparatus.

On one side in the lateral direction (in this example, left side) of the clamping plate 17, a drawing unit 14 is secured which has a pen plotter unit 13 and an inkjet unit 15. On the other side (in this example, right side) of the clamping plate 17, a dryer 50 is secured which dries ink applied to a nail 11 by blowing hot air.

Further, between the drawing unit 14 and the dryer 50, an image acquiring unit 16 for recognizing a position and shape of the nail 11 is provided.

In the present embodiment, a shape (curved shape) of a nail 11 in the width direction is obtained at a position where the width of the nail 11 is greatest, by a light section method, using a line light source (not shown) which emits linear light in the width direction of the nail 11 and the image acquiring unit 16 (for example, camera).

The way of acquiring the shape (curved shape) of a nail 11, however, is not limited to the one using the light section method.

The shape (curved shape) of a nail 11 may be acquired by a method of obtaining a curved state of the nail 11 through image analysis based on an image of the nail 11 acquired using only the image acquiring unit 16 (for example, camera), or it may be acquired by a method of obtaining a curved shape of a nail 11 by causing a needle to directly touch and scan the nail 11 in its width direction, as in the case of a roughness tester.

The pen plotter unit 13 includes a pen 13a which performs drawing on a nail 11. The pen plotter unit 13 is movable in the width direction and depth direction of the apparatus, integrally with the clamping plate 17, and is also movable in the up-and-down direction by driving means 13b such as a stepping motor.

The pen plotter unit 13 moves to a position immediately above an opening 32 of the finger holding case 30, and draws a rough draft, for example, on the surface of a nail 11 with the tip of the pen 13a lowered to come into contact with the surface of the nail 11.

The inkjet unit 15 includes an inkjet head 15a and an inkjet cartridge 15b, and performs printing of a nail design onto the nail 11 with the inkjet head 15a.

The inkjet unit 15 is movable in the width direction and depth direction of the apparatus, integrally with the clamping plate 17. The inkjet unit 15 moves to a position immediately above the opening 32 of the finger holding case 30, and applies a desired design onto the surface of the nail 11 with the inkjet head 15a.

Figure 3:
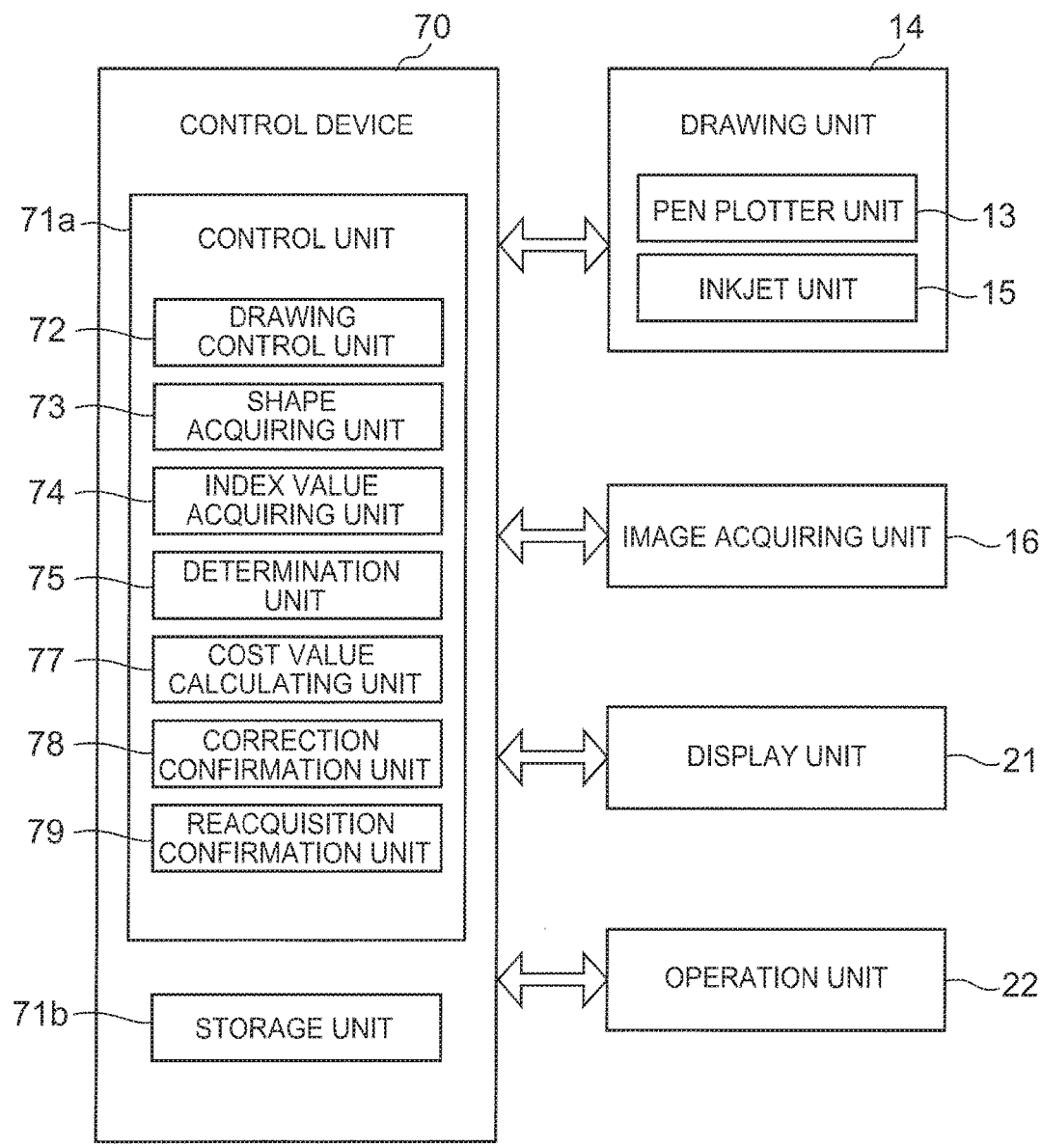
FIG. 3 is a block diagram of a control system of the drawing apparatus according to an embodiment of the present invention.

FIG. 3 is a block diagram of a control system of the drawing apparatus 10 of the present embodiment.

As shown in FIG. 3, a control device 70 includes a control unit 71a, which is configured with a central processing unit (CPU), and a storage unit 71b, which is configured with a read only memory (ROM), a random access memory (RAM), and so on. The control device 70 is connected with the drawing unit 14, the image acquiring unit 16, the display unit 21, and the operation unit 22.

The control unit 71a includes: a drawing control unit 72 which controls an operation of the drawing unit 14 (see FIG. 2) having the pen plotter unit 13 and the inkjet unit 15; a shape acquiring unit 73 which acquires a curved shape in the width direction of a nail 11 on the basis of a light section method, as will be described in detail later; an index value acquiring unit 74 which acquires an index value corresponding to a curved shape at an end of the nail 11 on the basis of the curved shape in the width direction of the nail 11; a determination unit 75 which determines whether the index value can be regarded as a reliable value, or, a value that properly represents the degree of curve of the curved shape, and also determines whether a cost value for use in correcting the index value is obtainable; a cost value calculating unit 77 which obtains a cost value; a correction confirmation unit 78 which is operable, in the case where the index value cannot be regarded as a reliable value, to confirm whether a user wishes the index value to be corrected on the basis of a cost value; and a reacquisition confirmation unit 79 which is operable, in the case where the index value cannot be regarded as a reliable value, to confirm whether the user wishes to reacquire the curved shape of the nail 11.

The functions of these units are implemented as the CPU of the control unit 71a reads and executes a program stored in the ROM of the storage unit 71b. It should be noted that the control device 70 corresponds to the nail shape acquiring device in the present invention.

<First Embodiment>

An operation of the drawing apparatus 10 of a first embodiment will now be described with reference to flowcharts in FIGS. 4 to 9.

Figure 4:
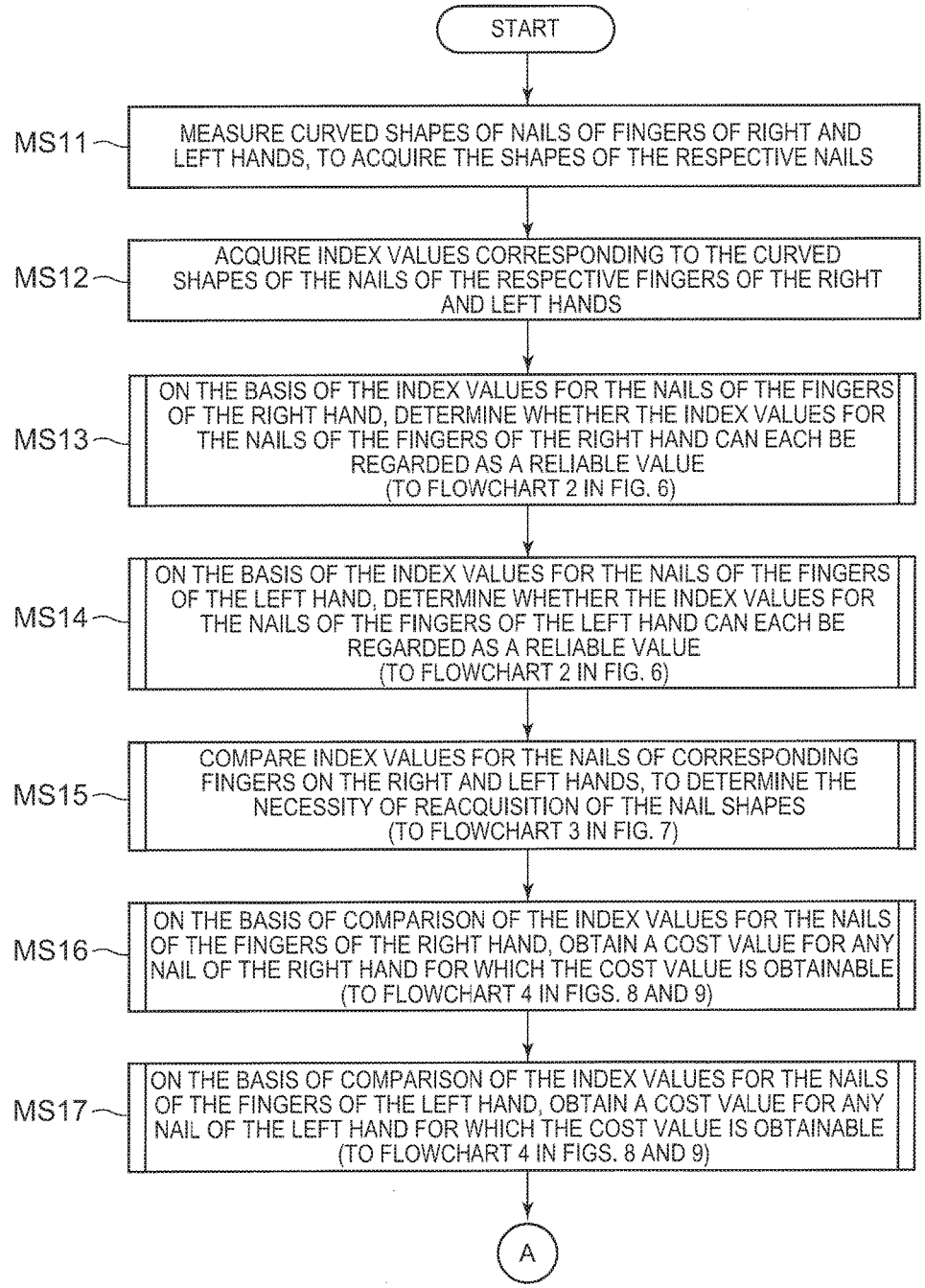
FIGS. 4 and 5 show a flowchart 1 as a main flow in a first embodiment of the present invention.
Figure 5:
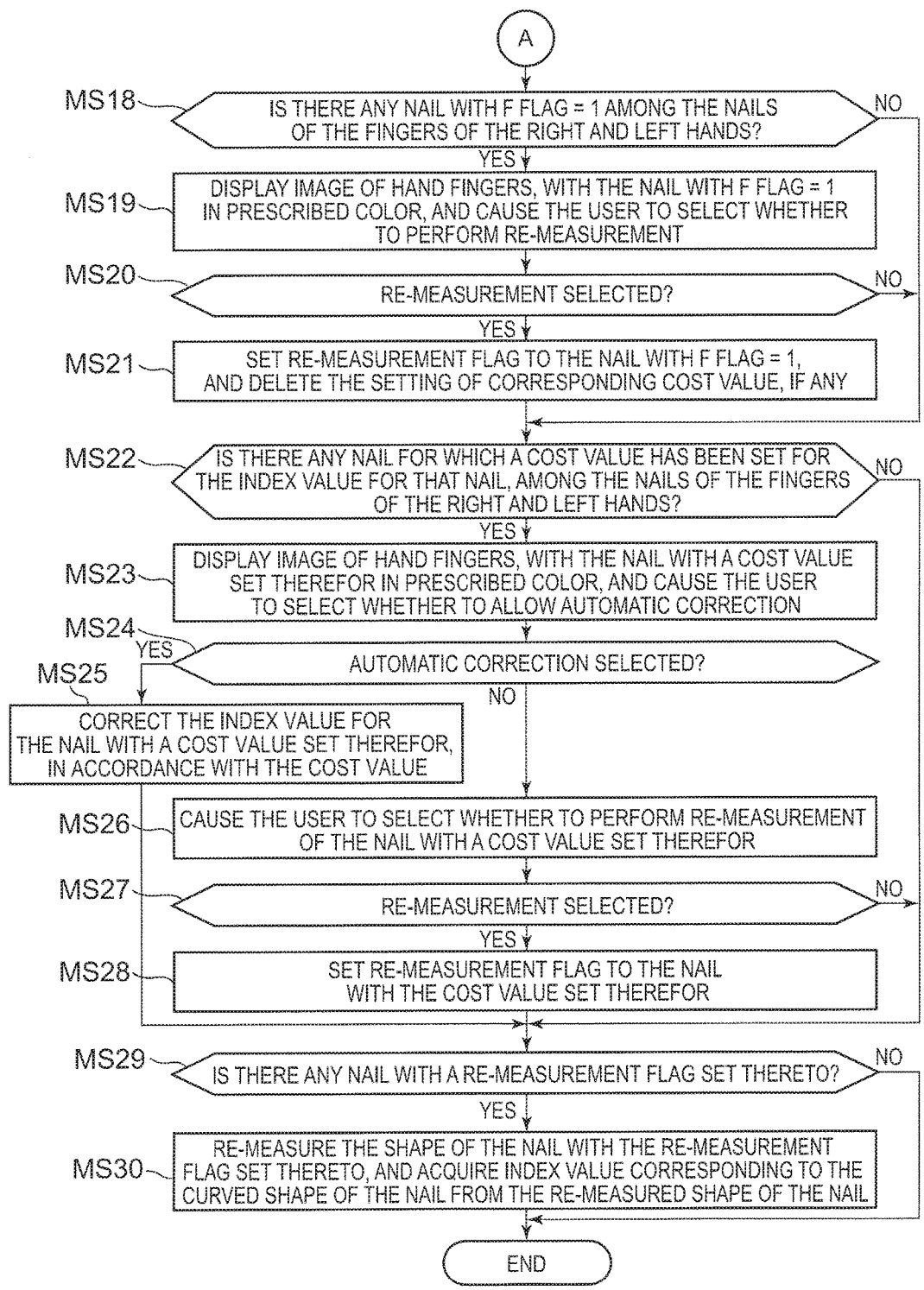

A flowchart 1 shown in FIGS. 4 and 5 is a main flow diagram illustrating a main flow of the drawing apparatus 10 of the first embodiment until it starts forming a nail design on a nail 11.

Here, "END" in the flowchart 1 in FIG. 5 is followed by the step of forming a nail design on a nail 11 by drawing the nail design on the nail 11, as described in the related art. The nail design drawn on a nail 11 at this time is a nail design which is obtained by acquiring a nail design that has been designated to be drawn on the nail 11 and by correcting the same in one of the following manners. When an index value for the nail 11 is regarded as a reliable value, the nail design is corrected in accordance with the index value. When the index value for the nail 11 is not regarded as a reliable value, an index value for the nail 11 is reacquired, and the nail design is corrected in accordance with the reacquired index value. Alternatively, when the index value for the nail 11 is not regarded as a reliable value, the index value is corrected on the basis of an index value for another nail 11 that has been regarded as a reliable value, and the nail design is corrected in accordance with the corrected index value.

Figure 6:
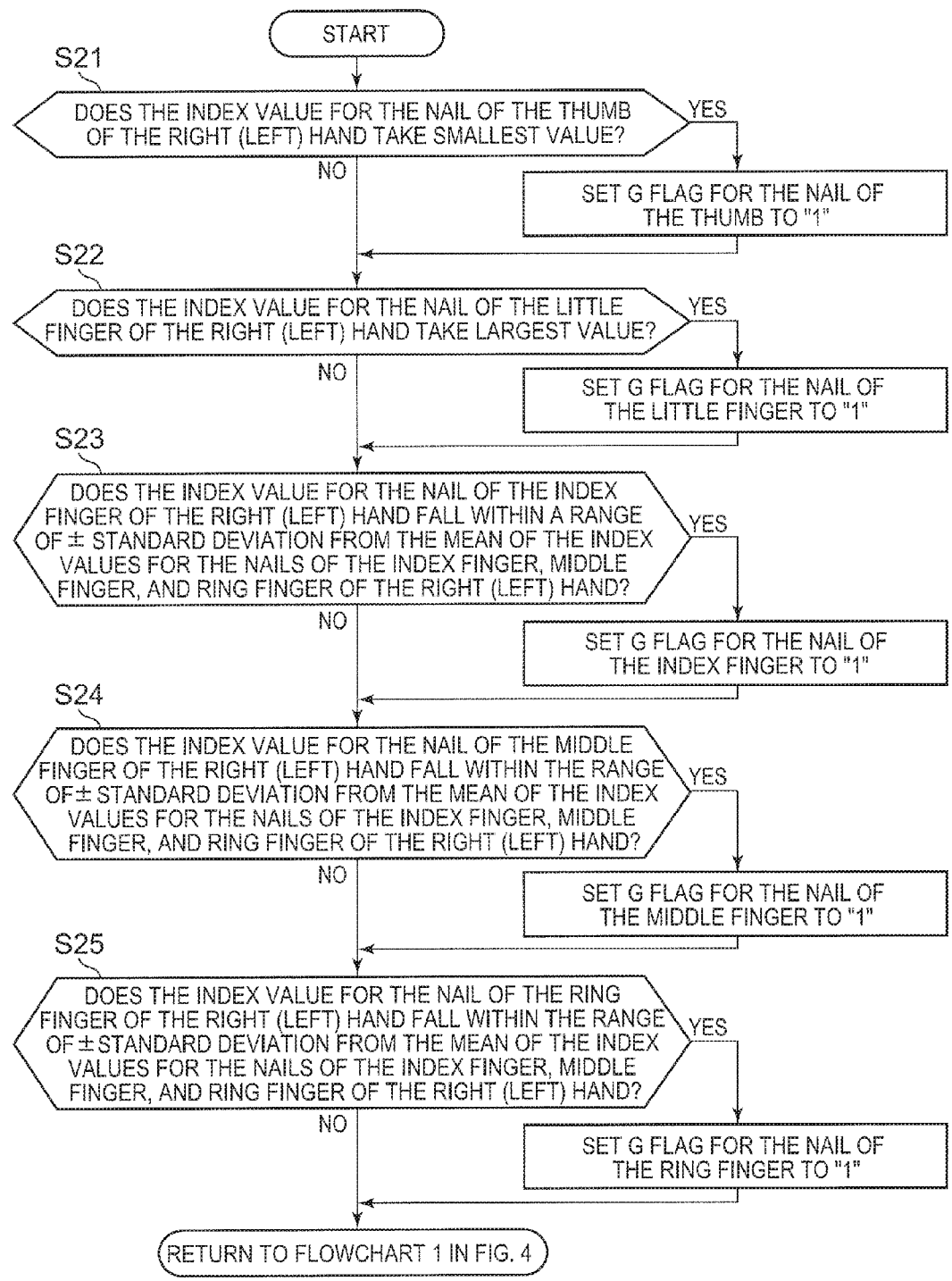
FIG. 6 shows a flowchart 2 as a subroutine of the flowchart 1.
Figure 7:
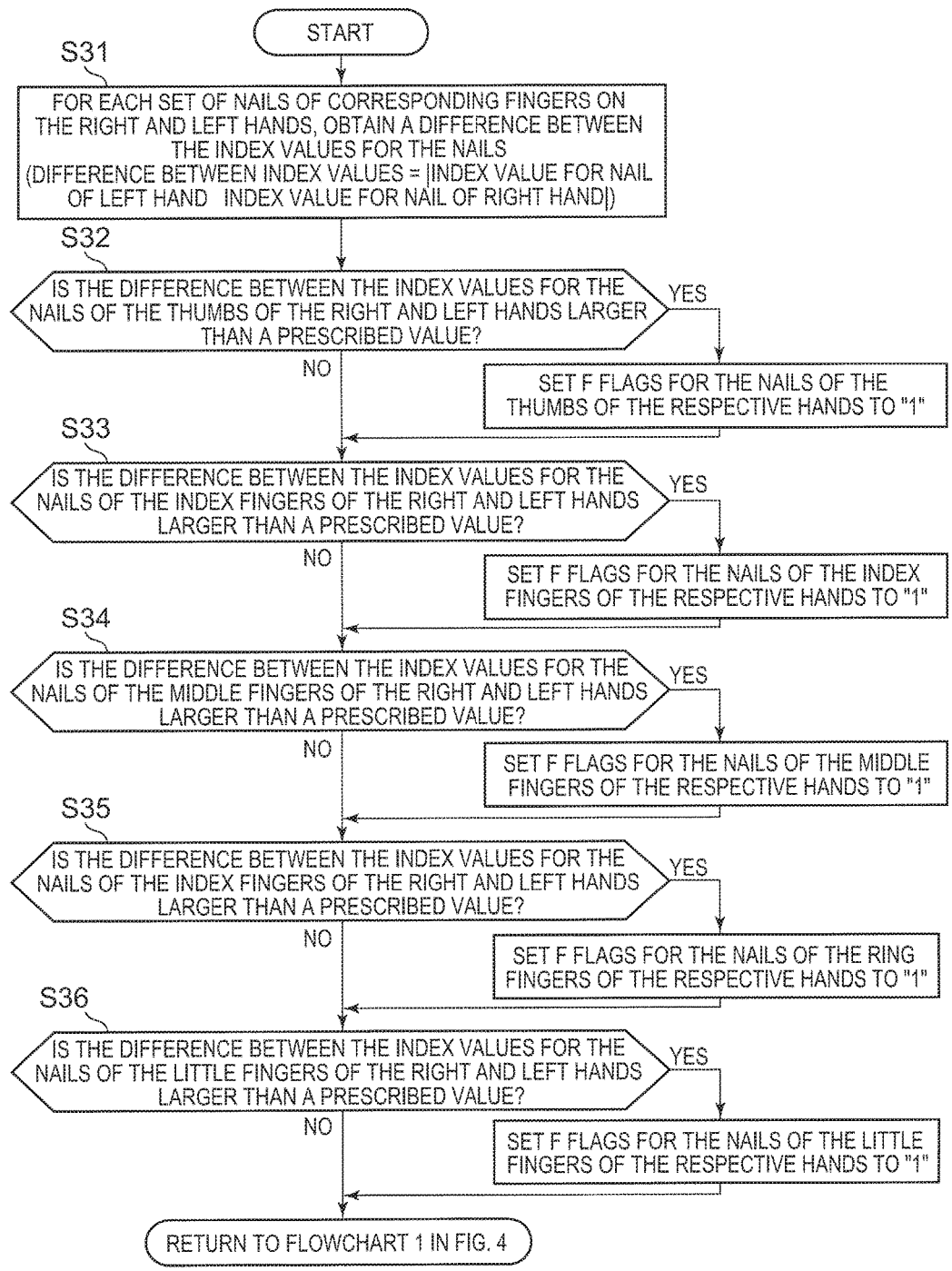
FIG. 7 shows a flowchart 3 as a subroutine of the flowchart 1.
Figure 8:
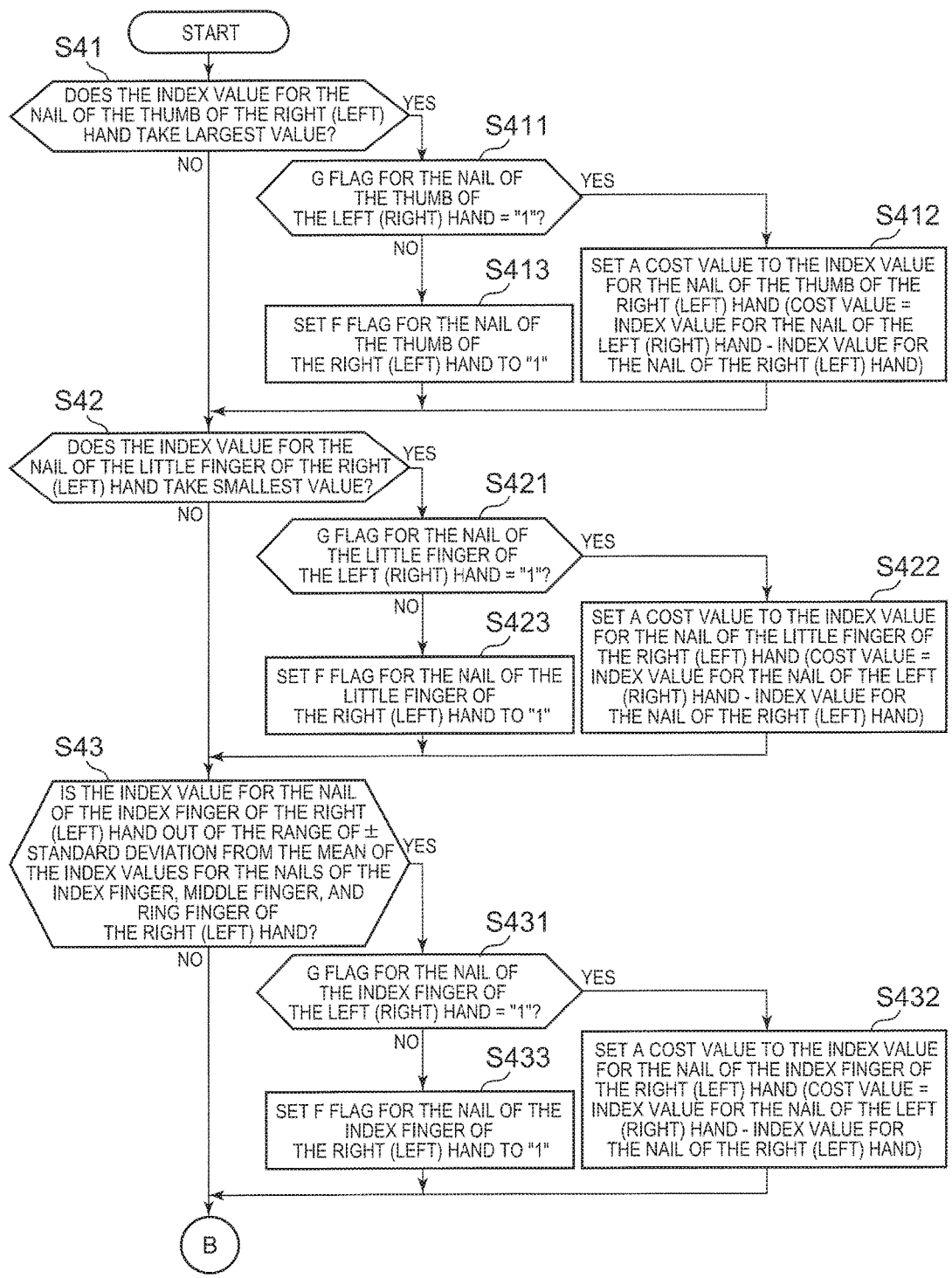
FIGS. 8 and 9 show a flowchart 4 as a subroutine of the flowchart 1.
Figure 9:
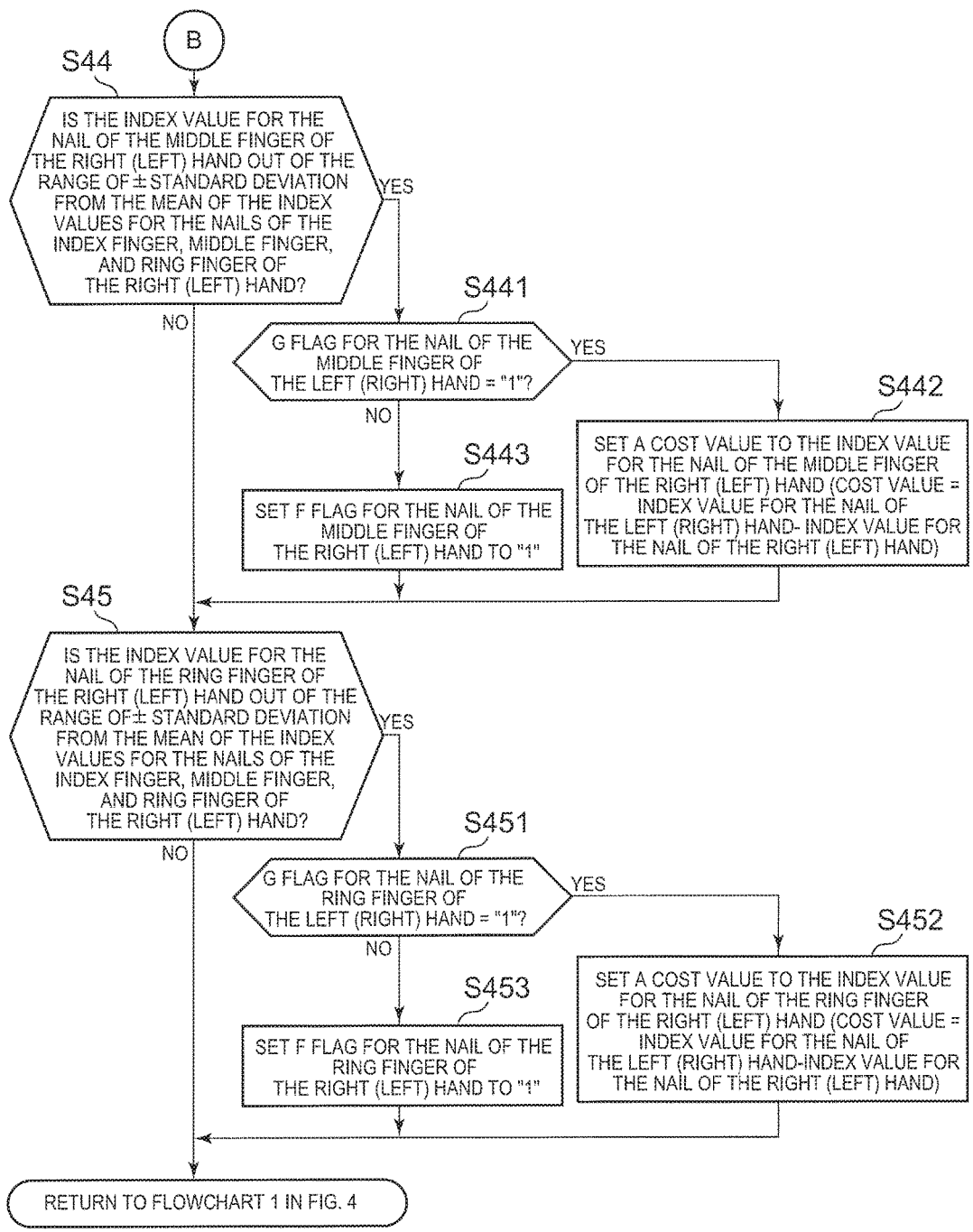

It should be noted that a flowchart 2 shown in FIG. 6, a flowchart 3 shown in FIG. 7, and a flowchart 4 shown in FIGS. 8 and 9 are subroutines which are called while the flowchart 1 shown in FIGS. 4 and 5 is executed.

As shown in FIG. 4, when the operation of the drawing apparatus 10 is started (START), the shape acquiring unit 73 (see FIG. 3) configured to acquire the curved shape of a nail drives a line light source (not shown) and the image acquiring unit 16 (see FIG. 2), to measure and acquire the curved shape of the nail 11 for each of a plurality of, for example five, fingers 12 of the respective hands (step MS11).

In the present embodiment, as shown in FIG. 1, the first finger insertion portion 23 is for receiving one finger 12 at a time. Thus, the shape acquiring unit 73 designates one of the thumb, index finger, middle finger, ring finger, and little finger of the right and left hands of the user in turn as a finger 12 for which the curved shape of the nail is to be measured, and acquires the curved shapes of the nails 11 of the designated fingers 12 successively.

In this case, for example when a finger 12 is inserted into the first finger insertion portion 23 in response to an instruction to insert the thumb of the right hand into the first finger insertion portion 23 which is displayed on the display unit 21 to designate measurement of the curved shape of the nail of the right thumb, the shape acquiring unit 73 regards the inserted finger 12 as the thumb of the right hand, and acquires the curved shape of the nail 11 of that finger 12 as the curved shape of the nail of the thumb of the right hand. The same applies to the other fingers 12.

It should be noted that the first finger insertion portion 23 may be of a size that allows two or more fingers 12 to be inserted at the same time. In such a case, two or more fingers 12 are inserted into the first finger insertion portion 23 simultaneously. The shape acquiring unit 73 recognizes which finger of which hand each of the plurality of fingers 12 inserted in the first finger insertion portion 23 corresponds to, depending on the shapes of the respective fingers and the arrangement order of the fingers, for example, and measures the curved shapes of the nails 11 of the respective fingers 12 simultaneously or successively.

When the shape acquiring unit 73 has acquired the curved shapes of the nails 11 of the plurality of, for example five, fingers 12 of the respective hands, next, the index value acquiring unit 74 (see FIG. 3) acquires index values corresponding to the curved shapes of the nails 11 of the fingers 12 of the respective hands (step MS12).

Figure 10:
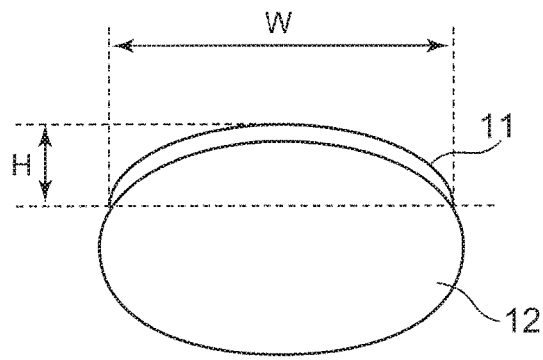
FIG. 10 illustrates an index value in the first embodiment.

Explained more specifically with reference to FIG. 10 which is a front view of a finger 12 whose tip end is seen in front, the index value acquiring unit 74 obtains, from the curved shape of a nail 11, a maximum value H of the height with the line connecting both ends of the nail 11 as the base, and a width W between the both ends, as shown in FIG. 10. The index value acquiring unit 74 then divides the maximum height H of the nail 11 by the width W of the nail 11, and acquires the resultant value as an index value corresponding to the curved shape (index value=H/W).

When the index value acquiring unit 74 has acquired the index values for the nails 11 of the plurality of, for example five, fingers 12 of the respective hands, the determination unit 75 (see FIG. 3) determines whether each index value acquired can be regarded as a reliable value, i.e. whether it can be used as a value that properly represents the degree of curve of the curved shape of the corresponding nail (steps MS13, MS14).

In the present embodiment, the determination unit 75 follows the flowchart 2 shown in FIG. 6, where it first determines, on the basis of the index values for the nails 11 of a plurality of, for example five, fingers 12 of the right hand, whether the index values for the nails 11 of the five fingers 12 of the right hand can each be regarded as a reliable value (step MS13). Thereafter, the determination unit 75 determines, on the basis of the index values for the nails 11 of the plurality of fingers 12 of the left hand, whether the index values for the nails 11 of the fingers 12 of the left hand can each be regarded as a reliable value (step MS14). The steps MS13 and MS14, however, may be performed in inverse order.

Specific determinations made by the determination unit 75 in the steps MS13 and MS14 will be described below with reference to the flowchart 2 shown in FIG. 6.

It should be noted that the steps MS13 and MS14 are identical in terms of basic determination procedure; they differ only in that it is determined in step MS13 whether the index values for the nails 11 of the fingers 12 of the right hand can be regarded as reliable values or not, and it is determined in step MS14 whether the index values for the nails 11 of the fingers 12 of the left hand can be regarded as reliable values or not. Therefore, in the following, the procedure in the step MS13 of determining whether the index values for the nails 11 of the fingers 12 of the right hand can be regarded as reliable values or not will be described primarily; the description of the step MS14 will be simplified.

As shown in FIG. 6, when the step MS13 is started (START), the determination unit 75 compares the index value for the nail 11 of the thumb of the right hand with the index values for the nails 11 of the remaining four fingers 12 (index finger, middle finger, ring finger, and little finger) of the right hand, to see whether the index value for the nail 11 of the thumb of the right hand takes a smallest value among them (step S21).

It should be noted that, in the case of the step MS14, the word "right" in the above description for the step MS13 may be read as "left", as indicated as "(left)" in the flowchart 2. Thus, in the following, the description thereof will be omitted. The same applies to the remaining process steps in the flowchart 2.

Here, generally, the nail 11 of a thumb (or a first toe) is wide and flat, as compared to the nails 11 of the other fingers (or the other toes) 12. Therefore, it is highly likely that the index value for the nail 11 of a thumb or a first toe takes the smallest value among the index values for the nails 11 of the five fingers 12 of a same hand or the five toes 12 of a same foot.

Thus, if the index value for the nail 11 of the thumb of the right hand takes the smallest value (Yes in step S21), the determination unit 75 determines that this index value for the nail 11 of the thumb of the right hand is high in reliability, and sets a G flag for this nail 11 of the thumb of the right hand to "1". The process then proceeds to the determination on the nail 11 of a next finger 12 (step S22).

On the other hand, if the index value for the nail 11 of the thumb of the right hand does not take the smallest value (No in step S21), the determination unit 75 refrains from setting the G flag to "1", and the process proceeds to the determination on the nail 11 of the next finger 12 (step S22).

It should be noted that the index value for the nail 11 of the thumb of the right hand not taking the smallest value does not necessarily mean that the index value is wrong, or, that the curved shape of the nail 11 was not measured properly. The determination in step S21 is made merely for recording that the reliability is high in the case where it is considered that the reliability is high.

Next, the determination unit 75 compares the index value for the nail 11 of the little finger of the right hand with the index values for the nails 11 of the remaining four fingers 12 (thumb, index finger, middle finger, and ring finger) of the right hand, to see whether the index value for the nail 11 of the little finger of the right hand takes a largest value among them (step S22).

Here, generally, the nail 11 of a little finger is narrow in width as compared to the nails 11 of the other fingers 12, so it is highly likely that the index value for the nail 11 of the little finger takes the largest value.

Thus, if the index value for the nail 11 of the little finger of the right hand takes the largest value (Yes in step S22), the determination unit 75 determines that this index value for the nail 11 of the little finger of the right hand is high in reliability, and sets a G flag for this nail 11 of the little finger of the right hand to "1". The process then proceeds to the determination on the nail 11 of a next finger 12 (step S23).

On the other hand, if the index value for the nail 11 of the little finger of the right hand does not take the largest value (No in step S22), the determination unit 75 refrains from setting the G flag to "1", and the process proceeds to the determination on the nail 11 of the next finger 12 (step S23).

Next, the determination unit 75 makes a determination on the reliability of the index value for the nail 11 of the index finger of the right hand (step S23), a determination on the reliability of the index value for the nail 11 of the middle finger of the right hand (step S24), and a determination on the reliability of the index value for the nail 11 of the ring finger of the right hand (step S25). For the nails 11 of these three fingers 12, the determinations are made based on the same criteria.

That is, for these three fingers 12, generally, the widths and heights of the respective nails 11 would not differ considerably. Therefore, the index values for the nails 11 of the three fingers 12 are used to obtain a mean as well as a standard deviation that indicates dispersion from the mean. Then, if an index value falls within a range of ±standard deviation from the mean, the determination unit 75 determines that the index value is high in reliability (Yes in step S23; Yes in step S24; or Yes in step S25), and sets a G flag for the nail 11 of the same type finger 12 to "1".

On the other hand, for each of the nails 11 of these three fingers 12, if the index value for that nail 11 is out of the range of ±standard deviation from the mean, then the determination unit 75 refrains from setting the G flag to "1", and the process proceeds to the next determination.

That is, in the case where the determination result in step S23 is No, the determination unit 75 proceeds to the next determination step S24, without setting the G flag for the nail 11 of the index finger of the right hand to "1". In the case where the determination result in step S24 is No, the determination unit 75 proceeds to the next determination step S25, without setting the G flag for the nail 11 of the middle finger of the right hand to "1". In the case where the determination result in step S25 is No, the flowchart 2 in FIG. 6 is terminated, with the G flag for the nail 11 of the ring finger of the right hand being not set to "1", and the process returns to the flowchart 1 in FIG. 4.

In this manner, when the flowchart 2 in FIG. 6 as the subroutine in step MS13 in the flowchart 1 in FIG. 4 is finished, next, the flowchart 2 in FIG. 6 as the subroutine in step MS14 is executed. In this step MS14, merely the same procedure as in the step MS13 is carried out, with the nails 11 of the fingers 12 of the "right" hand in the above description being read as the nails 11 of the fingers 12 of the "left" hand, as described above. Thus, the description of the step MS14 will be omitted here.

While it is shown in the flowchart 2 in FIG. 6 that once the process is started, the reliabilities are determined for: the index value for the nail 11 of the thumb (step S21), the index value for the nail 11 of the little finger (step S22), the index value for the nail 11 of the index finger (step S23), the index value for the nail 11 of the middle finger (step S24), and the index value for the nail 11 of the ring finger (step S25) in this order, the order may be changed as appropriate.

When the processing in the flowchart 2 in FIG. 6 as the subroutine in the step MS14 is finished, next, the control unit 71a carries out determination processing in the flowchart 3 shown in FIG. 7, in which the index values for the nails 11 of the same type fingers 12 on the right and left hands (i.e. thumbs, index fingers, middle fingers, ring fingers, or little fingers on opposite hands) are compared for, for example, five fingers of the respective hands, to see whether the index values for the nails 11 can each be regarded as a reliable value or not, to thereby determine whether there is any nail 11 the curved shape of which should presumably be reacquired.

The specific processing will now be described with reference to the flowchart 3 shown in FIG. 7.

When the step MS14 is finished and the process proceeds to step MS15, the processing in the flowchart 3 in FIG. 7 as a subroutine corresponding to the step MS15 is started (START), and first, a difference between the index values for the nails 11 of same type fingers 12 on the right and left hands is obtained for each of, for example, the five fingers of both hands (step S31).

Specifically, a difference between the index values for the nails 11 of the thumbs as the same type fingers 12 on the right and left hands is calculated (by subtracting the index value for the nail 11 of the thumb of the right hand from the index value for the nail 11 of the thumb of the left hand), and an absolute value of the resultant value is obtained as the difference for the nails 11 of the thumbs.

It should be noted that the absolute value is obtained merely for the purpose of preventing the reversal of the + and − signs even when the difference is calculated by subtracting the index value for the nail 11 of the thumb of the left hand from the index value for the nail 11 of the thumb of the right hand. It is necessary to obtain such an absolute value in the case where a prescribed value (threshold value) described below is to be set as a positive value, while it is unnecessary to obtain an absolute value in the case where positive and negative prescribed values (threshold values) are both to be set.

In step S31, the processing of obtaining the difference, described above by giving as an example the case of the thumbs, is also performed for the nails 11 of the remaining four fingers 12. As a result, a difference between the index values for the nails 11 of the thumbs, a difference between the index values for the nails 11 of the index fingers, a difference between the index values for the nails 11 of the middle fingers, a difference between the index values for the nails 11 of the ring fingers, and a difference between the index values for the nails 11 of the little fingers are obtained.

Following the step S31, it is determined whether the difference between the index values for the nails 11 of the thumbs is larger than a prescribed value (threshold value) (step S32).

Here, generally, the index values for the nails 11 of the same type fingers 12 on the right and left hands tend to take values close to each other. It means that, when the curved shapes of the nails 11 have been measured accurately, the difference between the index values should not be so large.

The index values for the nails 11 of the same type fingers 12 on the right and left hands, however, will not be exactly the same.

Thus, as an expected value of the difference between the index values, a relatively large value, i.e. a value that is presumably obtained when the curved shape of either nail 11 was not measured accurately, is set as the prescribed value (threshold value) and stored in the storage unit 71b.

It should be noted that the prescribed value (threshold value) may be common to the nails 11 of all the fingers 12, or different prescribed values (threshold values) may be set for the different fingers 12.

Here, in order to make the determination more strict (thereby making the re-measurement necessary), the prescribed value may be set to a relatively small value, while to make the determination more lenient (thereby making the re-measurement unnecessary), the prescribed value may be set to a relatively large value.

Taking into consideration the later processing of prompting a user to re-measure the curved shape of a nail 11, however, if the determination is too strict, the frequency of prompting the user to do re-measurement will increase, even in the case where there is no need to prompt the re-measurement. On the other hand, if the determination is too lenient, the user may not be prompted to do re-measurement even in the case where the re-measurement is necessary. The prescribed value (threshold value) is set to an appropriate value in view of the foregoing.

The description of the flow is now resumed.

If the difference between the index values for the nails 11 of the thumbs is larger than the prescribed value (threshold value) (Yes in step S32), an F flag, indicating the presence/absence of need for re-measurement of the curved shape, is set to "1" for both nails 11 of the thumbs of the right and left hands, indicating that there is a need to re-measure the curved shapes, so that in later processing, a user will be prompted to perform re-measurement (or will be confirmed whether to perform the re-measurement) for the nails 11 of the thumbs of the right and left hands. The process then proceeds to the determination on next fingers 12 (step S33).

It should be noted that the F flag is set to "1" for the nails 11 of both fingers 12, because it is difficult to determine which one of the nails 11 of the fingers 12 requires re-measurement of its curved shape.

As seen in the flowchart 3 in FIG. 7, in step S33 and on, processing similar to that for the nails 11 of the thumbs is merely performed on the nails 11 of the other fingers 12. Thus, a detailed description thereof will be omitted. Successively for the nails 11 of the index fingers, the nails 11 of the middle fingers, the nails 11 of the ring fingers, and the nails 11 of the little fingers, it is determined whether the difference between the index values is larger than a prescribed value (threshold value) or not, as in the case of the nails 11 of the thumbs, and if so (Yes in step S33; Yes in step S34; Yes in step S35; or Yes in step S36), the F flag is set to "1" for the nails 11 of both fingers 12 on the right and left hands for which the difference between the index values has been determined to be larger than the prescribed value (threshold value).

When the determination processing according to the flowchart 3 in FIG. 7 is finished, the process returns to the flowchart 1 in FIG. 4 again, and proceeds to step MS16.

It should be noted that in the flowchart 3 in FIG. 7 as well, the order of the steps S32 through S36 is not limited to that shown in the flowchart 3; it may be changed as appropriate.

When the process proceeds to the step MS16 in the flowchart 1 in FIG. 4, the processing shown in the flowchart 4 in FIGS. 8 and 9, as a subroutine corresponding to the step MS16, is started ("START" in the flowchart 4 in FIG. 8).

That is, the processing of comparing, with one another, the index values for the nails 11 of a plurality of, for example five, fingers 12 of the right hand and obtaining a cost value for any nail 11 of the right hand for which it has been determined that it is possible to obtain the cost value for use in correcting the index value is started.

When this processing is started, as shown in FIG. 8, the determination unit 75 compares the index value for the nail 11 of the thumb of the right hand with the index values for the nails 11 of the remaining fingers 12 (index finger, middle finger, ring finger, and little finger) of the right hand, to determine whether the index value for the nail 11 of the thumb of the right hand takes a largest value among them (step S41).

It should be noted that the way of correcting an index value using the cost value will be described in detail later in the process of correcting the index value.

In the case where the index value for the thumb, which is generally small, takes the largest value, it is highly likely that the index value is wrong.

Thus, if the index value for the nail 11 of the thumb of the right hand takes the largest value (Yes in step S41), the determination unit 75 further refers to the G flag for the nail 11 of the same type finger on the opposite hand, i.e. the thumb of the left hand, to confirm the reliability of the index value for the nail 11 of the thumb of the left hand (step S411).

If the G flag for the index value for the nail 11 of the thumb of the left hand is "1", meaning that it has been determined that the index value for the nail 11 of the thumb of the left hand can be regarded as a reliable value (high in reliability) (Yes in step S411), the determination unit 75 determines that the nail 11 of the thumb of the right hand, for which the determination is currently in progress, is a nail 11 for which a cost value is obtainable, and causes the cost value calculating unit 77, configured to obtain a cost value, to obtain the cost value (step S412).

Specifically, the cost value calculating unit 77 obtains a cost value for the nail 11 of the thumb of the right hand, for which it has been determined that the cost value is obtainable, by subtracting the index value for the nail 11 of the thumb of the right hand, for which it has been determined that the cost value is obtainable, from the index value for the nail 11 of the same type finger 12 on the opposite hand, i.e. the thumb of the left hand, the index value for which has been determined that it can be regarded as a reliable value.

The cost value calculating unit 77 then sets the obtained cost value as the cost value for the nail 11 of the thumb of the right hand, for which it has been determined that the cost value is obtainable.

It should be noted that the cost value is, as apparent from the above calculation, a value which is defined as a difference from the index value for the nail 11 of the same type finger 12 on the opposite hand, the index value being determined that it can be regarded as a reliable value.

On the other hand, if the reliability of the index value for the nail 11 of the thumb of the left hand is not high, i.e. the G flag is not "1" (No in step S411), the determination unit 75 refrains from determining that a cost value can be obtained for the nail 11 of the thumb of the right hand, for which the determination is currently in progress, and sets an F flag, indicating the presence/absence of need for re-measurement of the curved shape, for the nail 11 of the thumb of the right hand to "1", indicating that there is a need to re-measure the curved shape (step S413), so that in later processing, a user will be prompted to perform re-measurement (or confirmed whether to perform the re-measurement) for the nail 11 of the thumb of the right hand. The process then proceeds to the processing for the nail 11 of a next finger 12 (step S42).

It should be noted that it is not determined that a cost value is obtainable in the case where the determination result in step S411 is No, because the reliability of the index value for the nail 11 of the same type finger, as a basis for obtaining a cost value, is not high, meaning that it is difficult to obtain the cost value. If no cost value is obtained, the index value cannot be corrected, so the F flag is also set to "1".

When the process proceeds to step S42, the determination unit 75 now performs processing on the nail 11 of the little finger of the right hand, as in the case of the nail 11 of the thumb of the right hand described above. Specifically, the determination unit 75 compares the index value for the nail 11 of the little finger of the right hand with the index values for the nails 11 of the remaining fingers 12 of the right hand. If the index value for the nail 11 of the little finger of the right hand takes a smallest value among them (Yes in step S42), the determination unit 75 further confirms whether it has been determined that the index value for the nail 11 of the same type finger 12 on the opposite hand, i.e. the nail 11 of the little finger of the left hand, can be regarded as a reliable value (step S421). If the G flag for the index value for the nail 11 of the little finger of the left hand is "1", meaning that it has been determined that the index value for the nail 11 of the little finger of the left hand can be regarded as a reliable value (Yes in step S421), the determination unit 75 determines that the nail 11 of the little finger of the right hand, for which the determination is currently in progress, is a nail 11 for which a cost value is obtainable, and causes the cost value calculating unit 77 to obtain the cost value (step S422).

Specifically, as in the case of the nail 11 of the thumb of the right hand described above, the cost value calculating unit 77 obtains a cost value for the nail 11 of the little finger of the right hand, for which it has been determined that the cost value is obtainable, by subtracting the index value for the nail 11 of the little finger of the right hand, for which it has been determined that the cost value is obtainable, from the index value for the nail 11 of the same type finger 12 on the opposite hand, i.e. the little finger of the left hand, the index value for which has been determined that it can be regarded as a reliable value. The cost value calculating unit 77 then sets the obtained cost value as the cost value for the nail 11 of the little finger of the right hand, for which it has been determined that the cost value is obtainable.

On the other hand, as in the above-described case, if the reliability of the index value for the nail 11 of the little finger of the left hand is not high, i.e. the G flag is not "1" (No in step S421), the determination unit 75 refrains from determining that a cost value can be obtained for the nail 11 of the little finger of the right hand, for which the determination is currently in progress, and sets an F flag, indicating the presence/absence of need for re-measurement of the curved shape, for the nail 11 of the little finger of the right hand to "1", indicating that there is a need to re-measure the curved shape (step S423), so that in later processing, a user will be prompted to perform re-measurement (or confirmed whether to perform the re-measurement) for the nail 11 of the little finger of the right hand. The process then proceeds to the processing for the nail 11 of a next finger 12 (step S43).

When the process proceeds to step S43, the determination unit 75 performs processing on the nail 11 of the index finger of the right hand. Specifically, the determination unit 75 uses a mean and a standard deviation obtained from the index values for the nails 11 of the index finger, middle finger, and ring finger of the right hand, to make a comparison as to whether the index value for the nail 11 of the index finger of the right hand falls within or outside a range of ±standard deviation from the mean. If the index value for the nail 11 of the index finger of the right hand is out of this range (Yes in step S43), it further confirms whether it has been determined that the index value for the nail 11 of the same type finger 12 on the opposite hand, i.e. the nail 11 of the index finger of the left hand, can be regarded as a reliable value (step S431). If the G flag for the index value for the nail 11 of the index finger of the left hand is "1", meaning that it has been determined that the index value for the nail 11 of the index finger of the left hand can be regarded as a reliable value (Yes in step S431), the determination unit 75 determines that the nail 11 of the index finger of the right hand, for which the determination is currently in progress, is a nail 11 for which a cost value is obtainable, and causes the cost value calculating unit 77 to obtain the cost value (step S432).

Specifically, as in the case described above, the cost value calculating unit 77 obtains a cost value for the nail 11 of the index finger of the right hand, for which it has been determined that the cost value is obtainable, by subtracting the index value for the nail 11 of the index finger of the right hand, for which it has been determined that the cost value is obtainable, from the index value for the nail 11 of the same type finger 12 on the opposite hand, i.e. the index finger of the left hand, the index value for which has been determined that it can be regarded as a reliable value. The cost value calculating unit 77 then sets the obtained cost value as the cost value for the nail 11 of the index finger of the right hand, for which it has been determined that the cost value is obtainable.

On the other hand, as in the above-described case, if the reliability of the index value for the nail 11 of the index finger of the left hand is not high, i.e. the G flag is not "1" (No in step S431), the determination unit 75 refrains from determining that a cost value can be obtained for the nail 11 of the index finger of the right hand, for which the determination is currently in progress, and sets an F flag, indicating the presence/absence of need for re-measurement of the curved shape, for the nail 11 of the index finger of the right hand to "1", indicating that there is a need to re-measure the curved shape (step S433), so that in later processing, a user will be prompted to perform re-measurement (or confirmed whether to perform the re-measurement) for the nail 11 of the index finger of the right hand. The process then proceeds to the processing for the nail 11 of a next finger 12 (step S44).

It should be noted that the processing regarding the index value for the nail 11 of the middle finger of the right hand (steps S44, S441, S442, S443) and the processing regarding the index value for the nail 11 of the ring finger of the right hand (steps S45, S451, S452, S453) are basically the same as the above-described processing regarding the index value for the nail 11 of the index finger of the right hand (steps S43, S431, S432, S433). The processing regarding the index value for the nail 11 of the middle finger of the right hand (steps S44, S441, S442, S443) is as described above for the processing regarding the index value for the nail 11 of the index finger of the right hand (steps S43, S431, S432, S433) except that the term "index finger" in the description is read as "middle finger". The processing regarding the index value for the nail 11 of the ring finger of the right hand (steps S45, S451, S452, S453) is also as described above for the processing regarding the index value for the nail 11 of the index finger of the right hand (steps S43, S431, S432, S433) except that the term "index finger" in the description is read as "ring finger". Therefore, the description thereof will be omitted.

When the processing regarding the index value for the nail 11 of the ring finger is lastly finished, the process returns to the flowchart 1 in FIG. 4 again, and proceeds to step MS17.

It should be noted that in the flowchart 4 in FIGS. 8 and 9, the processing is carried out successively for the index value for the nail 11 of the thumb, the index value for the nail 11 of the little finger, the index value for the nail 11 of the index finger, the index value for the nail 11 of the middle finger, and the index value for the nail 11 of the ring finger in this order. The order of the processing, however, is not limited thereto; it may be changed as appropriate.

When the process proceeds to step MS17 in the flowchart 1 in FIG. 4, the processing similar to that performed in the step MS16 is now performed on the nails 11 of the fingers 12 of the left hand.

That is, in the processing in the flowchart 4 in FIGS. 8 and 9 as the subroutine of the step MS17, for example the processing in step S41 becomes determination as to whether the index value for the nail 11 of the thumb of the left hand takes a largest value or not. The processing in step S411 becomes determination as to whether the G flag for the nail 11 of the thumb of the right hand is "1" or not. If the determination result in step S411 is Yes, a cost value is obtained by subtracting the index value for the nail 11 of the thumb of the left hand from the index value for the nail 11 of the thumb of the right hand, and the obtained cost value is set as the cost value for the index value for the nail 11 of the thumb of the left hand.

As such, the overall processing in the flowchart 4 in FIGS. 8 and 9 as the subroutine of the step MS17 is as described above for the step MS16, except that the words "right" and "left" in the description are read as "left" and "right", respectively. The description thereof will thus be omitted.

When the step MS17 is finished, the process proceeds to step MS18 next.

By the processing up to the step MS17, the F flag has been set to "1" for any nail 11, among those of the plurality of, for example five (in total, ten), fingers 12 of the right and left hands, for which there is presumably a need to re-measure the curved shape of that nail 11.

Then, next, the reacquisition confirmation unit 79 (see FIG. 3) confirms whether there is a nail 11 with the F flag="1", among the nails 11 of the plurality of, for example five (in total, ten), fingers 12 of the right and left hands (step MS18). If there is a nail 11 with the F flag="1" (Yes in step MS18), an image of the hand fingers is displayed on the display unit 21, with the nail 11 with the F flag="1" being distinguishably displayed in prescribed color, to confirm whether a user wishes to re-measure the curved shape of the nail 11 with the F flag="1" displayed in the prescribed color (step MS19).

Figure 11:
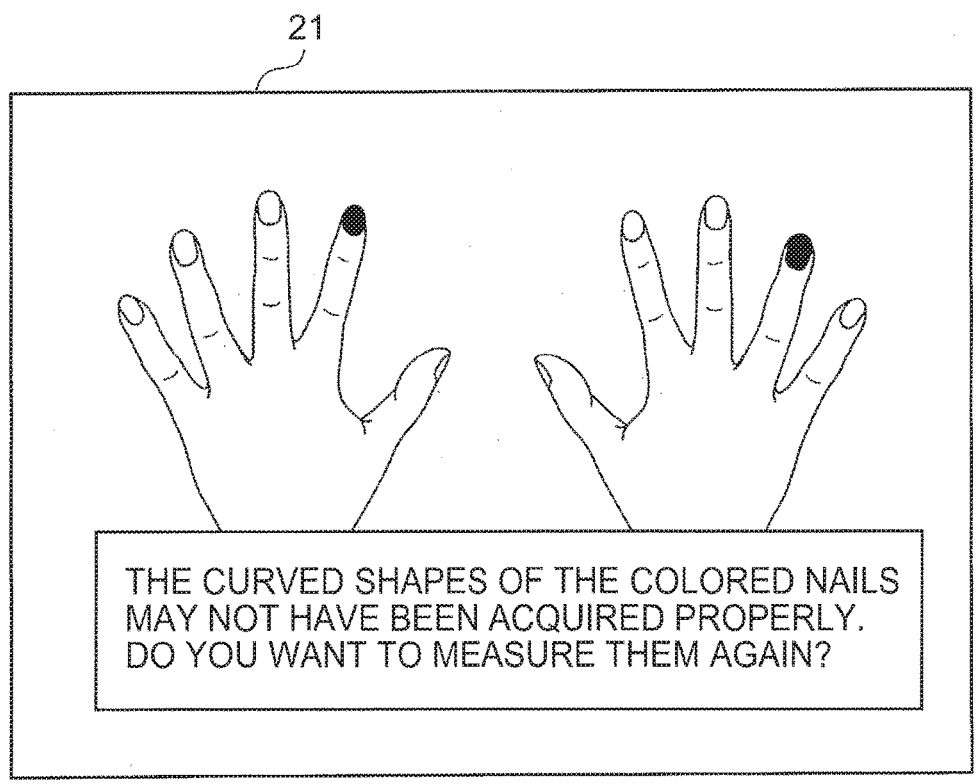
FIG. 11 shows, by way of example, a display for confirmation of re-measurement in the first embodiment.

For example, in the case where the F flag for the nail 11 of the index finger of the left hand and the F flag for the nail 11 of the ring finger of the right hand are "1", an image as shown in FIG. 11 is displayed on the display unit 21.

It should be noted that the way of confirming whether to perform re-measurement or not is not limited to the configuration of displaying a prescribed message in characters on the display unit 21. For example, it may be configured such that an image of the hand fingers alone is displayed on the display unit 21 and a message that "The curved shapes of the colored nails may not have been acquired properly. Do you want to measure them again?" may be provided in the form of voice guidance.

Next, the reacquisition confirmation unit 79 determines whether the re-measurement has been selected in response to the display (step MS20).

That is, when the user operates the operation unit 22 (see FIG. 1) to select re-measurement, the reacquisition confirmation unit 79 detects that the re-measurement has been selected (Yes in step MS20), and sets a re-measurement flag to the nail 11 with the F flag="1" (the nail 11 of the index finger of the left hand and the nail 11 of the ring finger of the right hand in FIG. 11). In the case where a cost value has been set, the setting of the cost value that becomes unnecessary as a result of the re-measurement is deleted (step MS21), and the process proceeds to the next step MS22.

It should be noted that the description was made above about the case where the user selected the re-measurement by operating the operation unit 22. In the case where the display unit 21 has a touch panel function, however, it is of course possible to display a select button on the display unit 21.

If there is no nail 11 with the F flag="1" among the nails 11 of all of the plurality of, for example five (in total, ten), fingers 12 of the right and left hands (No in step MS18), the process proceeds to step MS22, with the steps MS19, M20, and MS21 being skipped. The process also proceeds to step MS22 in the case where the re-measurement was not selected (No in step MS20).

When the process proceeds to step MS22, the correction confirmation unit 78 (see FIG. 3) confirms whether a cost value has been set for any of the nails 11 of the plurality of, for example five (in total, ten), fingers 12 of the right and left hands. If there is a nail 11 for which a cost value has been set (Yes in step MS22), an image of the hand fingers is displayed, with the nail 11 for which a cost value has been set being distinguishably displayed in prescribed color, to confirm whether a user wants automatic correction to be done according to the cost value, on the index value for the nail 11 having the cost value set therefor and displayed in the prescribed color (step MS23).

Figure 12:
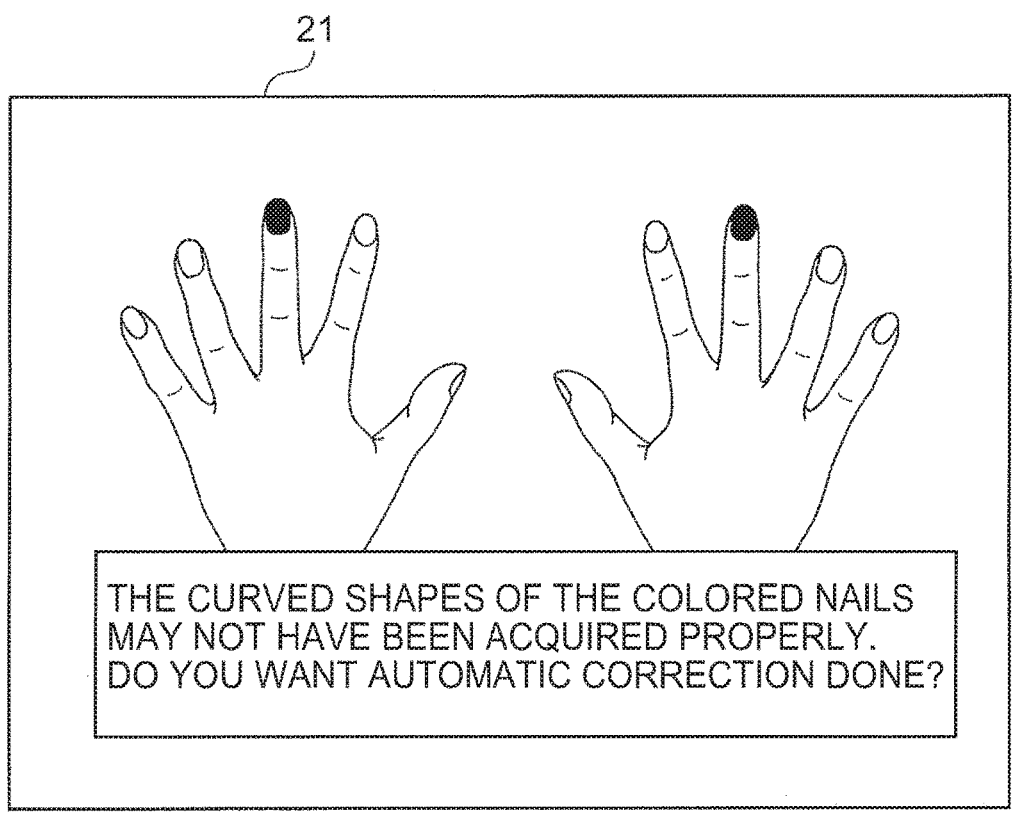
FIG. 12 shows, by way of example, a display for confirmation of automatic correction in the first embodiment.

For example, in the case where cost values have been set for the nails 11 of the middle fingers of the right and left hands, an image as shown in FIG. 12 is displayed on the display unit 21.

It should be noted that the way of confirming whether to perform automatic correction or not is not limited to the configuration of displaying a prescribed message in characters on the display unit 21. For example, it may be configured such that an image of the hand fingers alone is displayed on the display unit 21 and a message that "The curved shapes of the colored nails may not have been acquired properly. Do you want automatic correction done?" may be provided in the form of voice guidance.

Next, the correction confirmation unit 78 determines whether the automatic correction has been selected in response to the display (step MS24).

That is, when the user operates the operation unit 22 (see FIG. 1) to select automatic correction, the correction confirmation unit 78 detects that the automatic correction has been selected (Yes in step MS24), and corrects the index value for the nail 11 for which a cost value has been set (the nails 11 of the middle fingers of the right and left hands in FIG. 12), in accordance with the cost value (step MS25). The control unit 71a then regards the index value corrected by the correction confirmation unit 78 as a reliable value.

Specifically, in the case where a cost value A has been set for an index value X for a nail 11, a correction value $\Delta$ is obtained by multiplying the cost value A by a constant f ($0<f\leq1$), and this correction value $\Delta$ is added to the index value X to thereby obtain an automatically corrected index value Y ($Y=X+\Delta=X+A\times f$).

The cost value has been defined as a difference from the index value for the nail 11 that has been determined it can be regarded as a reliable value. When the constant f is 1, the index value for the nail 11 being automatically corrected becomes the same as the index value for the nail 11 of the same type finger 12 on the opposite hand that has been determined it can be regarded as a reliable value.

In other words, this processing is performed, on the basis of the fact that the index values for the nails 11 of the same type fingers 12 on the right and left hands tend to take values close to each other, for making the index value for one nail 11 approach the index value for the other nail 11 that has been regarded as a reliable value.

If the constant f is set to 1 so as to correct the index value for one nail 11 to be exactly the same as that for the other nail 11, however, the correction may be too much. Thus, the range of the constant f is set to $0<f\leq1$ so that an appropriate constant f can be set therein.

On the other hand, if the automatic correction was not selected (No in step MS24), there is a possibility that the user wants to perform re-measurement on the nail 11 for which the cost value has been set. Thus, the reacquisition confirmation unit 79 confirms whether the user wants to re-measure the curved shape of the nail 11 for which the cost value has been set and which is currently displayed in prescribed color as a result of the step MS23 (step MS26).

For example, the reacquisition confirmation unit 79 switches the text message to the one as shown in FIG. 11, while continuously displaying the image of the hand fingers as shown in FIG. 12.

The reacquisition confirmation unit 79 then determines whether the re-measurement has been selected in response to the display (step MS27).

That is, when the user operates the operation unit 22 (see FIG. 1) to select re-measurement, the reacquisition confirmation unit 79 detects that the re-measurement has been selected (Yes in step MS27), and sets a re-measurement flag to the nail 11 for which the cost value has been set (the nails 11 of the middle fingers of the right and left hands in FIG. 12) (step MS28). The process then proceeds to the next step MS29.

The process also proceeds to step MS29 in the case where it is determined in step MS22 that there is no nail 11 for which a cost value has been set (No in step MS22), and in the case where the re-measurement was not selected (No in step MS27).

In step MS29, the shape acquiring unit 73 confirms whether there is a nail 11 to which the re-measurement flag has been set, among the nails 11 of the plurality of, for example five (in total, ten), fingers 12 of the right and left hands. If there is a nail 11 to which the re-measurement flag has been set (Yes in step MS29), the shape acquiring unit 73 issues an instruction for re-measurement to the user and performs re-measurement of the curved shape of the nail 11. Further, the index value acquiring unit 74, configured to acquire an index value, acquires an index value corresponding to the curved shape of the ends of the nail 11 from the re-measured curved shape of the nail 11 (step MS30). The control unit 71a regards the acquired index value to be a reliable value, and uses it as a value that properly represents the degree of curve of the curved shape. A series of processing is thus finished.

If there is no nail 11 to which a re-measurement flag has been set (No in step MS29), the step MS30 is skipped. The index values that have been acquired are regarded as reliable values, and are used as values that properly represent the degrees of the curves of the curved shapes. The series of processing is thus finished.

When the series of processing is finished (END), the processing of forming a nail design on a nail 11 is started, as described above.

In the above description, the drawing apparatus 10 has been described which is capable of both re-measurement of the curved shapes of the nails 11 and automatic correction of the index values for the nails 11. However, it is of course possible that a drawing apparatus is capable of either the re-measurement of the curved shapes of the nails 11 or the automatic correction of the index values for the nails 11.

The processing from step MS18 to the end of the flowchart 1 shown in FIGS. 4 and 5 as the main flow is configured to be performed collectively on the nails 11 of the plurality of, for example five (in total, ten), fingers 12 of the right and left hands. The flow, however, may be modified such that the processing in this part is performed on a nail 11 of a finger 12 at a time and is repeated ten times for the respective nails 11 of the ten fingers 12.

<Second Embodiment>

A drawing apparatus 10 according to a second embodiment of the present invention will now be described.

The second embodiment is similar to the first embodiment in terms of basic configuration as well as in terms of basic content of the processing. The following description will focus on the different portions; the description of the same portions may be omitted as appropriate.

In the first embodiment, one index value was set for one nail 11.

The index value is a value which corresponds to the degree of inclination of the right and left ends of a nail 11 according to the curved state of the nail 11. It is therefore possible to define the following two index values: a right-side index value which corresponds to the degree of inclination of the right-side end of the nail 11, and a left-side index value which corresponds to the degree of inclination of the left-side end thereof.

According to the conventional method of performing processing before printing in accordance with the degree of inclination of the ends of a nail 11 so as to adjust the nail design to conform to the curved shape of the nail 11, the processing load is reduced by assuming that the inclinations on the right and left ends of the nail 11 are the same. If index values are given for the respective ends, however, the processing can naturally be performed individually on each end, which is desirable from the standpoint of forming the nail design, although the processing load would increase.

In the above-described processing in the first embodiment as well, there is a case where it is desirable to use a right-side index value and a left-side index value for the right and left ends, respectively, of a nail 11 for performing processing before printing in accordance with the degrees of inclination of the respective ends in the width direction of the nail 11 so as to adjust the nail design to conform to the curved shape of the nail 11.

The second embodiment differs from the first embodiment only in that a right-side index value and a left-side index value are given to a single nail 11, and thus, the processing similar to that in the first embodiment is performed for the right-side index value and also performed for the left-side index value.

It should be noted that in the second embodiment, the ends of a nail 11 are distinguished between the right and left ends, which correspond to the right and left when the nail 11 is observed in a front view.

More specifically, for a right hand (or foot), the thumb (or first toe) side corresponds to the left side and the little finger (or fifth toe) side corresponds to the right side, and for a left hand (foot), the thumb (or first toe) side corresponds to the right side and the little finger (or fifth toe) side corresponds to the left side.

Specific processing performed by the drawing apparatus 10 of the second embodiment will be described below with reference to flowcharts in FIGS. 13 to 18.

Figure 13:
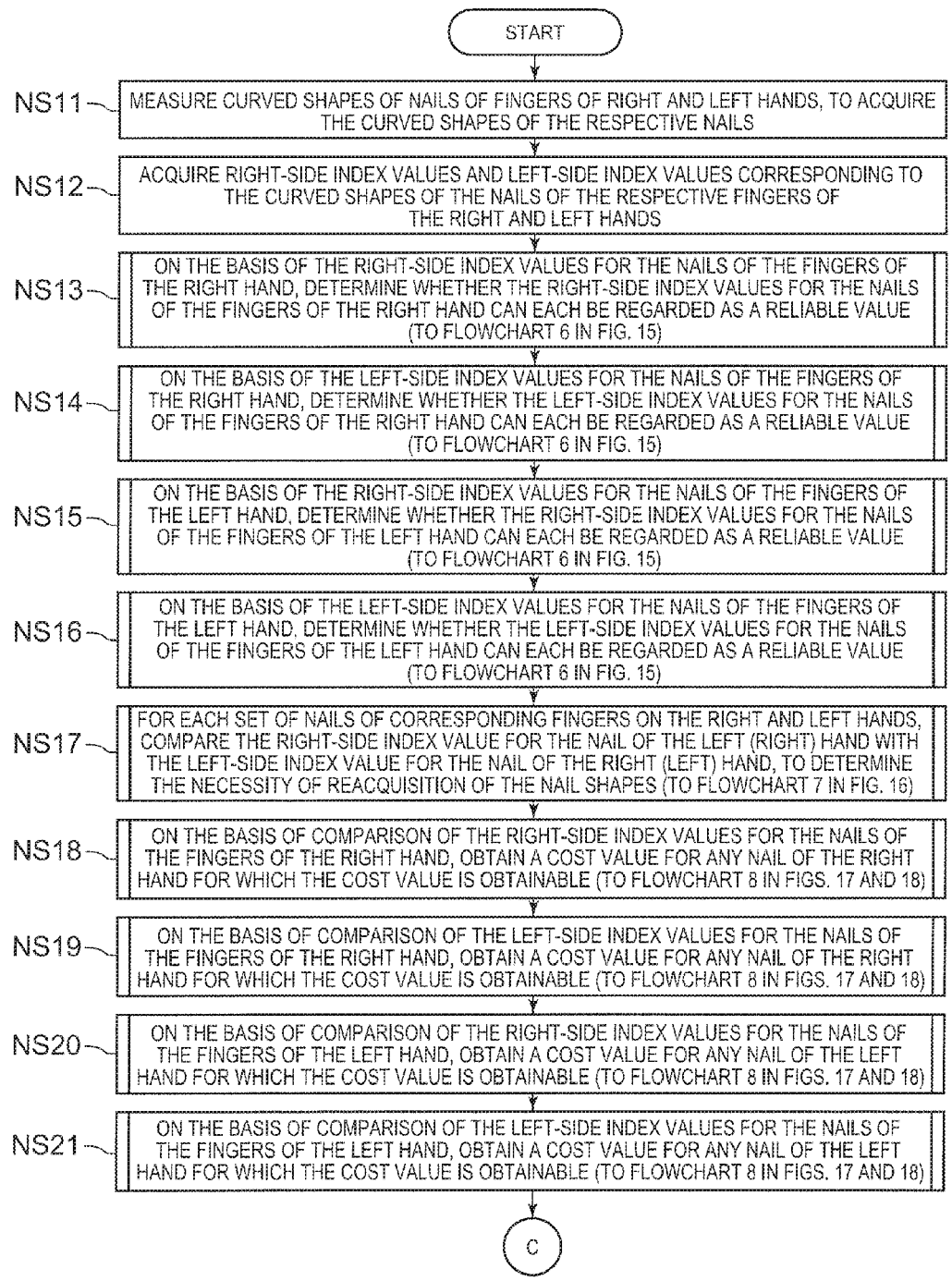
FIGS. 13 and 14 show a flowchart 5 as a main flow in a second embodiment of the present invention.
Figure 14:
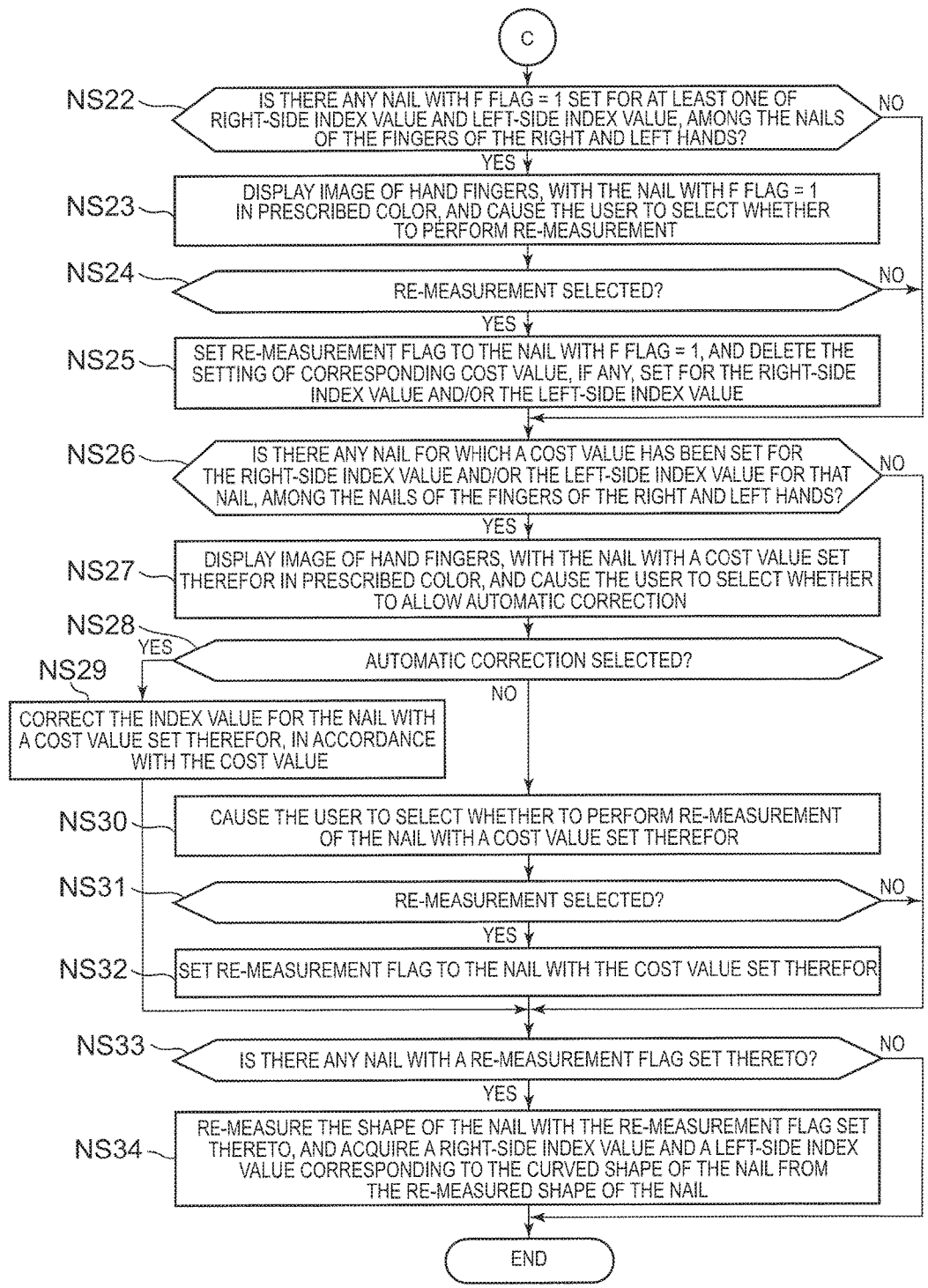

A flowchart 5 shown in FIGS. 13 and 14 is a main flow diagram illustrating a main flow of the drawing apparatus 10 of the second embodiment until it starts forming a nail design on a nail 11.

That is, the flowchart 5 corresponds to the flowchart 1 in FIGS. 4 and 5 in the first embodiment.

Figure 15:
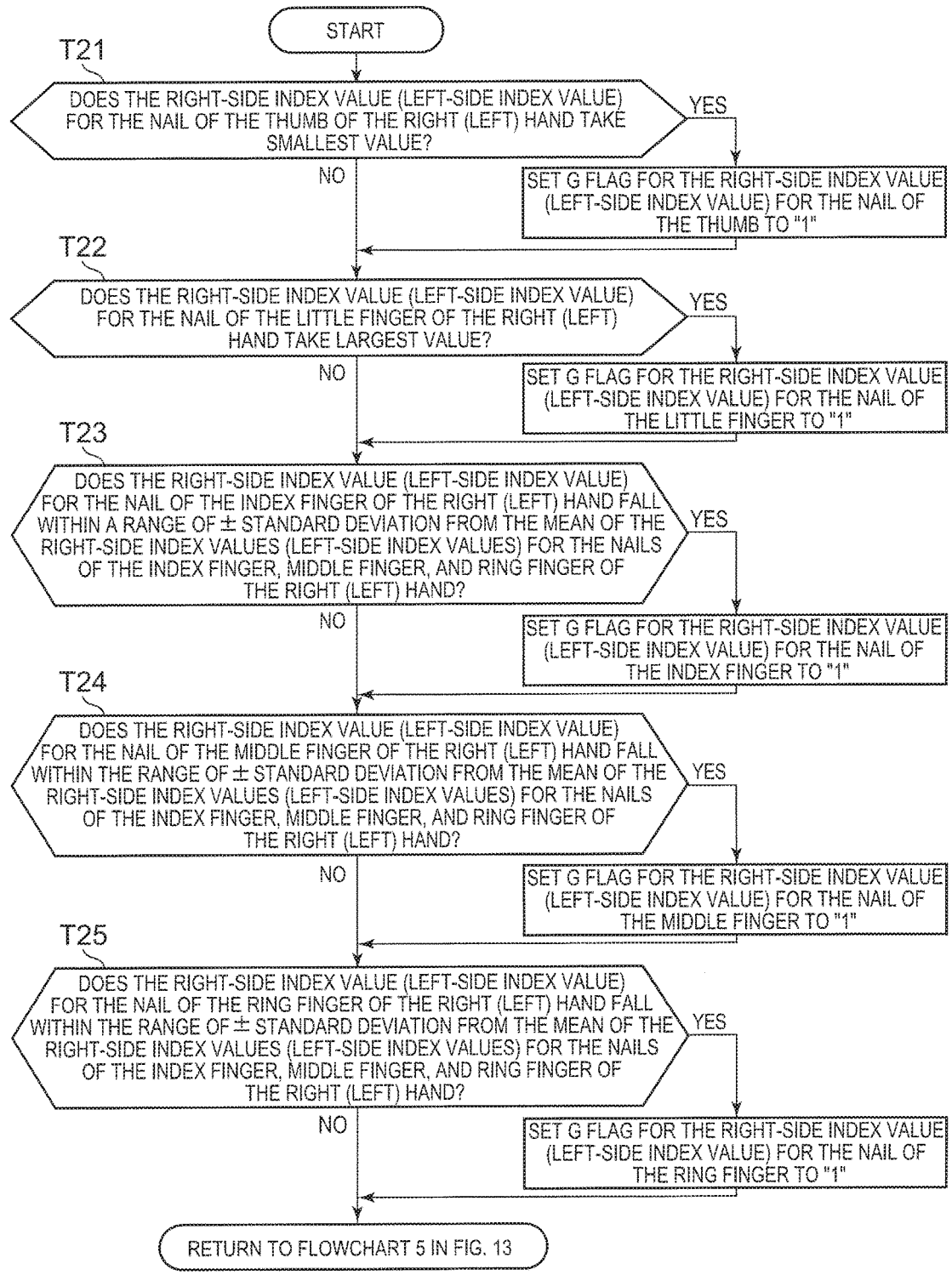
FIG. 15 shows a flowchart 6 as a subroutine of the flowchart 5.
Figure 16:
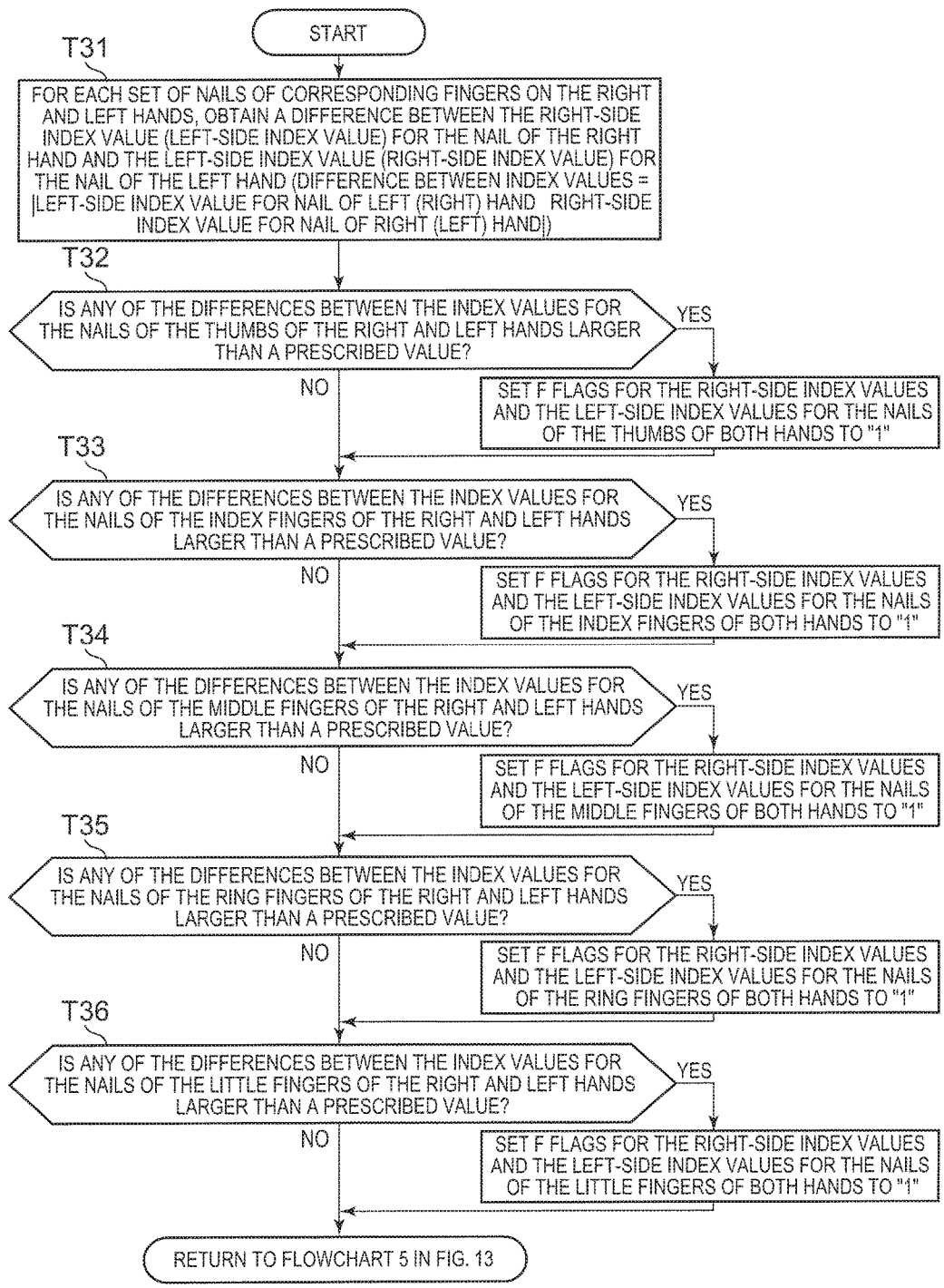
FIG. 16 shows a flowchart 7 as a subroutine of the flowchart 5.
Figure 17:
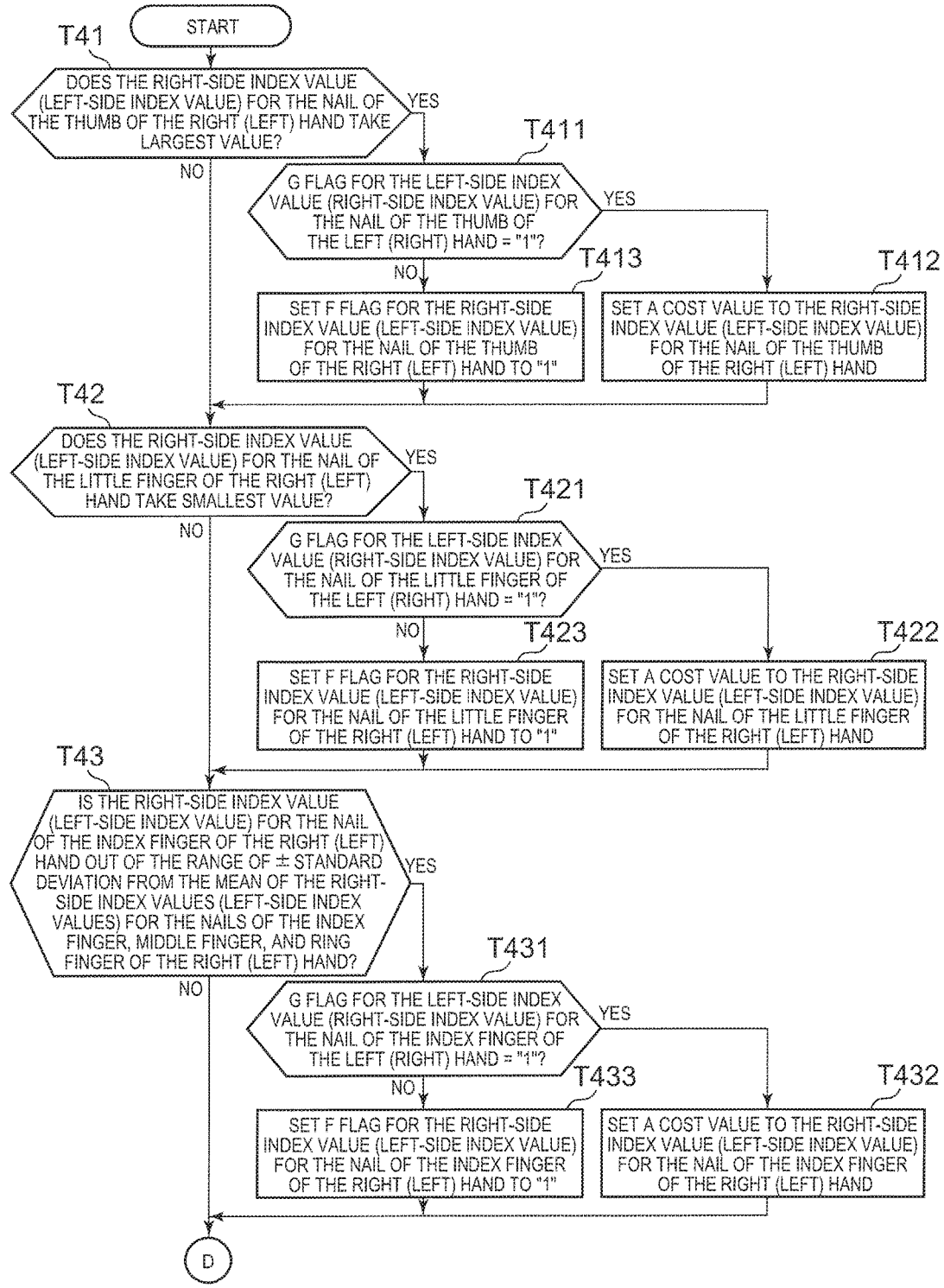
FIGS. 17 and 18 show a flowchart 8 as a subroutine of the flowchart 5.
Figure 18:
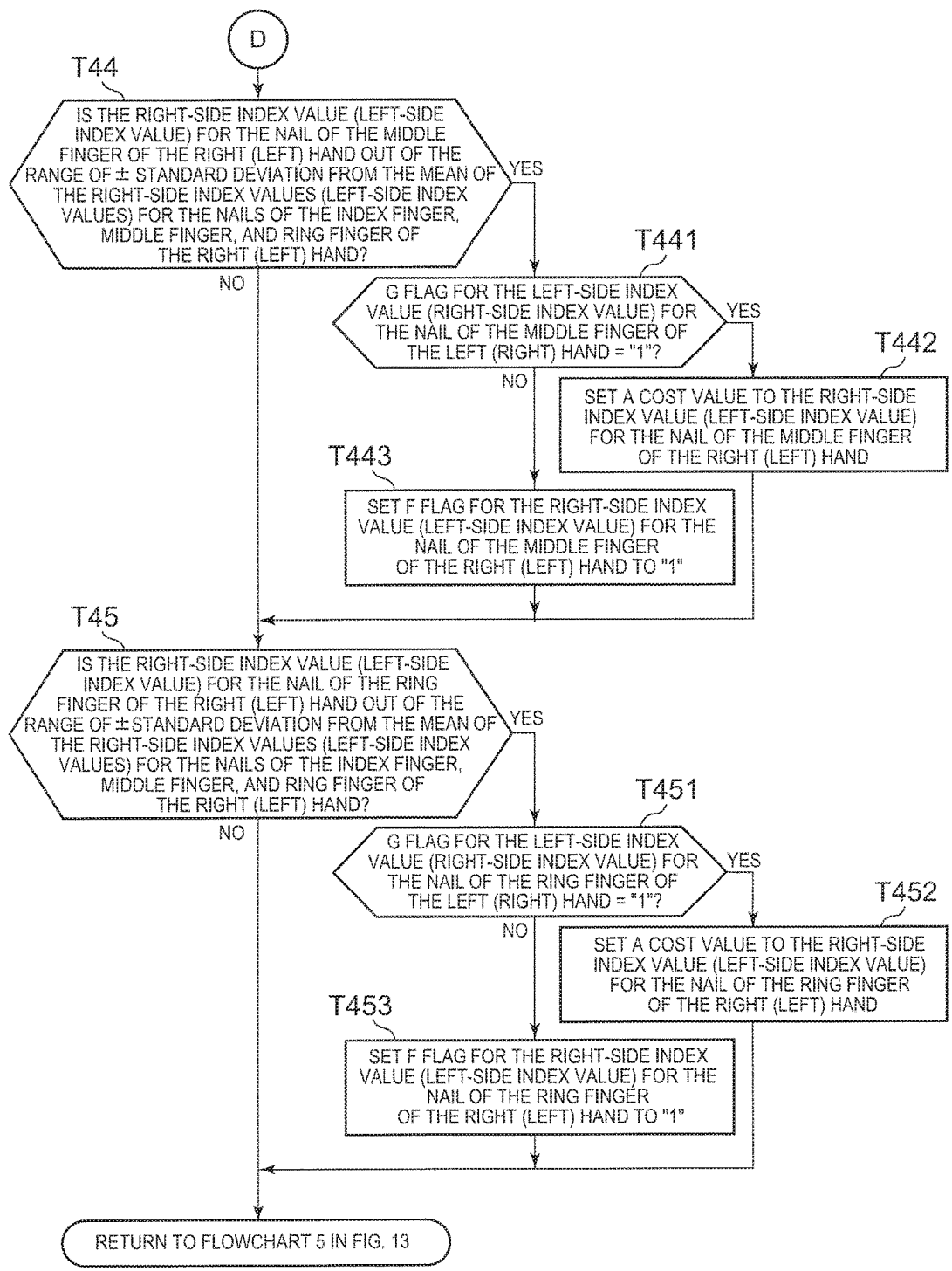

A flowchart 6 shown in FIG. 15, a flowchart 7 shown in FIG. 16, and a flowchart 8 shown in FIGS. 17 and 18 are subroutines which are called while the flowchart 5 shown in FIGS. 13 and 14 is executed. The flowchart 6 in FIG. 15 corresponds to the flowchart 2 in FIG. 6. The flowchart 7 in FIG. 16 corresponds to the flowchart 3 in FIG. 7. The flowchart 8 in FIGS. 17 and 18 corresponds to the flowchart 4 in FIGS. 8 and 9.

For the sake of easy understanding of the following description of the processing, the relationship of the index values (right-side index value and left-side index value) for use in comparison and the like will be explained first. Hands and feet are bilaterally symmetrical. Their nails 11 also tend to be bilaterally symmetrical.

Thus, for example in the case of comparing the degrees of inclination of the ends in the width direction of the nails 11 of same type fingers 12 on the right and left hands, it is preferable that the comparison is made between the ends of the nails 11 that are located on the same sides (or, facing each other) in the state where the hands are joined in prayer position.

More specifically, a right-side index value for the right end in the width direction of the nail 11 of the right thumb corresponds to (and thus, may be compared with) a left-side index value for the left end in the width direction of the nail 11 of the left thumb.

Similarly, a left-side index value for the left end in the width direction of the nail 11 of the right thumb corresponds to (and thus, may be compared with) a right-side index value for the right end of the nail 11 of the left thumb. The same applies to the remaining fingers 12 (index fingers, middle fingers, ring fingers, and little fingers).

Therefore, the processing described below may be outlined as follows. While the processing was performed on the index values for the nails 11 of the fingers 12 of the right hand and the index values for the nails 11 of the fingers 12 of the left hand in the first embodiment, in the second embodiment, the processing is performed on the right-side index values for the nails 11 of the fingers 12 of the right hand and the left-side index values for the nails 11 of the fingers 12 of the left hand, and the processing is also performed on the left-side index values for the nails 11 of the fingers 12 of the right hand and the right-side index values for the nails 11 of the fingers 12 of the left hand. Otherwise, the basic content of the processing in the second embodiment is identical to that in the first embodiment.

As shown in FIG. 13, when an operation of the drawing apparatus 10 is started (START), the shape acquiring unit 73 (see FIG. 3), configured to acquire curved shapes of nails, drives the line light source (not shown) and the image acquiring unit 16 (see FIG. 2) to measure the curved shapes of the nails 11 of a plurality of, for example five, fingers 12 of the respective hands, to thereby acquire the curved shapes of the nails 11 (step NS11).

When the curved shapes of the nails 11 of the plurality of, for example five, fingers 12 of the respective hands have been acquired, next, the index value acquiring unit 74 (see FIG. 3) acquires right-side index values and left-side index values for the nails 11 of the fingers 12, as the index values corresponding to the curved shapes of the nails 11 of the plurality of, for example five, fingers 12 of the respective hands (step NS12).

Figure 19:
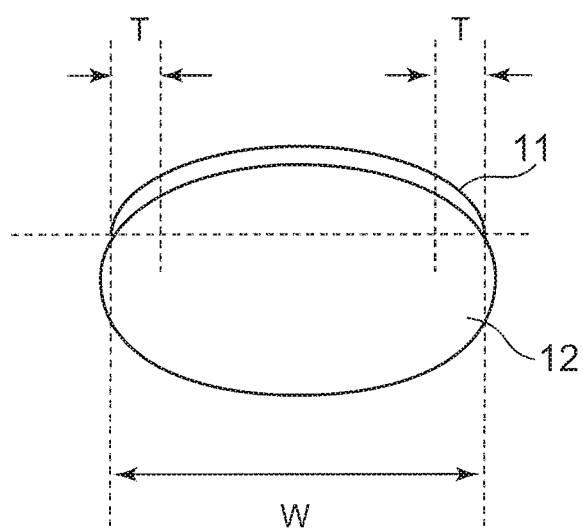
FIG. 19 illustrates index values (right-side index value, left-side index value) in the second embodiment.

More specifically, referring to FIG. 19 which is a front view of a finger 12 with its tip end in front, the index value acquiring unit 74 obtains, from the curved shape of the nail 11, a width W of the nail 11 connecting the right and left ends of the nail 11, as shown in FIG. 19.

Then, in accordance with a preset ratio, for example 10% with respect to a width of a nail, the index value acquiring unit 74 sets a prescribed range T from each end in the width direction of the nail 11 that corresponds to the preset ratio with respect to the obtained width W of the nail 11, and approximates the curved shape of the nail 11 in that range T by a straight line. The index value acquiring unit 74 then calculates an inclination of that straight line (by dividing a height of the nail 11 at the position of the length T from the end in the width direction by the length T), to thereby acquire the inclination as an index value.

That is, in the case where the preset ratio is 10%, the curved state of the nail 11 in the range T corresponding to 10% of the width of the nail 11 from the right end of the nail 11 is approximated as a straight line, and the inclination of the resultant straight line is acquired as a right-side index value for that nail 11. Similarly, the curved state of the nail 11 in the range T corresponding to 10% of the width of the nail 11 from the left end of the nail 11 is approximated as a straight line, and the inclination of the resultant straight line is acquired as a left-side index value for that nail 11.

When the right-side index values and left-side index values for the nails 11 of the plurality of fingers 12 of the respective hands have been acquired, next, the determination unit 75 (see FIG. 3) determines whether the acquired index values can be regarded as reliable values, i.e. whether they can be used as values that properly represent the degrees of the curves of the curved shapes (steps NS13, NS14, NS15, and NS16).

Specifically, when the process proceeds to step NS13, the processing of the flowchart 6 as the subroutine, shown in FIG. 15, is started (START), and the determination unit 75 first compares the right-side index value for the nail 11 of the thumb of the right hand with the right-side index values for the nails 11 of the remaining fingers 12 (index finger, middle finger, ring finger, and little finger) of the right hand. If the right-side index value for the nail 11 of the thumb of the right hand takes a smallest value among them (Yes in step T21), the determination unit 75 sets a G flag for the right-side index value for the nail 11 of the thumb of the right hand to "1", and the process proceeds to the next step T22.

On the other hand, if the right-side index value for the nail 11 of the thumb of the right hand does not take the smallest value (No in step T21), the determination unit 75 refrains from setting the G flag for the right-side index value for the nail 11 of the thumb of the right hand to "1", and the process proceeds to the next step T22.

When the process proceeds to step T22, the determination unit 75 compares the right-side index value for the nail 11 of the little finger of the right hand with the right-side index values for the nails 11 of the remaining fingers 12 (thumb, index finger, middle finger, and ring finger) of the right hand. If the right-side index value for the nail 11 of the little finger of the right hand takes a largest value among them (Yes in step T22), the determination unit 75 sets a G flag for the right-side index value for the nail 11 of the little finger of the right hand to "1", and the process proceeds to the next step T23.

On the other hand, if the right-side index value for the nail 11 of the little finger of the right hand does not take the largest value (No in step T22), the determination unit 75 refrains from setting the G flag for the right-side index value for the nail 11 of the little finger of the right hand to "1", and the process proceeds to the next step T23.

When the process proceeds to step T23, the determination unit 75 determines whether the right-side index value for the nail 11 of the index finger of the right hand falls within a range of ±standard deviation from a mean which is obtained from the right-side index values for the nails 11 of the index finger, middle finger, and ring finger of the right hand. If it falls within the range (Yes in step T23), the determination unit 75 sets a G flag for the right-side index value for the nail 11 of the index finger of the right hand to "1", and the process proceeds to the next step T24.

On the other hand, if it is out of the range (No in step T23), the determination unit 75 refrains from setting the G flag for the right-side index value for the nail 11 of the index finger of the right hand to "1", and the process proceeds to the next step T24.

Subsequently, similar processing is performed on the right-side index value for the nail 11 of the middle finger of the right hand and on the right-side index value for the nail 11 of the ring finger of the right hand as well. Here, the processing (step T24) regarding the right-side index value for the nail 11 of the middle finger of the right hand is as described above for the processing (step T23) regarding the right-side index value for the nail 11 of the index finger of the right hand, except that the term "index finger" in the description is read as "middle finger". Similarly, the processing (step T25) regarding the right-side index value for the nail 11 of the ring finger of the right hand is as described above for the processing (step T23) regarding the right-side index value for the nail 11 of the index finger of the right hand, except that the term "index finger" in the description is read as "ring finger". Therefore, the description thereof will be omitted.

When the processing in step T25 is finished, the process returns to the flowchart 5 in FIG. 13 again, and proceeds to the next step NS14.

In this step NS14, processing similar to that regarding the right-side index values for the nails 11 of the plurality of fingers 12 of the right hand, performed in the previous step NS13, is performed on the left-side index values for the nails 11 of the plurality of fingers 12 of the right hand. Therefore, the processing in step NS14 is as described above for the step NS13, except that the term "right-side index value(s)" in the description is read as "left-side index value(s)". Therefore, the description thereof will be omitted.

When the processing in step NS14 is finished, the process proceeds to step NS15 next. In this step NS15, processing similar to that regarding the right-side index values for the nails 11 of the plurality of fingers 12 of the right hand, performed in step NS13, is performed on the right-side index values for the nails 11 of the plurality of fingers 12 of the left hand. Therefore, the processing in step NS15 is as described above for the step NS13, except that the description of the nails 11 of the fingers 12 of the right hand is read as the description of the nails 11 of the fingers 12 of the left hand. Therefore, the description thereof will be omitted.

When the processing in step NS15 is finished, the process proceeds to step NS16 next. In this step NS16, processing similar to that regarding the right-side index values for the nails 11 of the plurality of fingers 12 of the right hand, performed in step NS13, is performed on the left-side index values for the nails 11 of the plurality of fingers 12 of the left hand. Therefore, the processing in step NS16 is as described above for the step NS13, except that the description of the nails 11 of the fingers 12 of the right hand is read as the description of the nails 11 of the fingers 12 of the left hand, and that the term "right-side index value(s)" in the description is read as "left-side index value(s)". Therefore, the description thereof will be omitted.

When the series of processing from step NS13 to step NS16 is finished, the G flag has been set to "1" for any of the right-side index values and left-side index values, among those for the nails 11 of the plurality of, for example five (in total, ten), fingers 12 of the right and left hands, that has been determined by the determination unit 75 that it can be regarded as a reliable value.

When the step NS16 is finished, next, the process proceeds to step NS17, where the control unit 71a carries out the determination processing in the flowchart 7 shown in FIG. 16 in which, for example for five fingers of the respective hands, the right-side index values and the left-side index values for the respective nails 11 of the same type fingers 12 on the right and left hands are compared to see whether the right-side index values and the left-side index values for the nails 11 can be regarded as reliable values or not, to thereby determine whether there is any nail 11 the curved shape of which should presumably be reacquired.

Specifically, when the process proceeds to step NS17, the processing according to the flowchart 7 as the subroutine, shown in FIG. 16, is started (START), and first, differences between the index values for the nails 11 of the same type fingers 12 are obtained (step T31).

For example, for the nails 11 of the thumbs, a difference between the right-side index value for the nail 11 of the thumb of the right hand and the left-side index value for the nail 11 of the thumb of the left hand is obtained, and a difference between the left-side index value for the nail 11 of the thumb of the right hand and the right-side index value for the nail 11 of the thumb of the left hand is also obtained.

While an absolute value is obtained here such that the difference takes a positive value, the process of obtaining the absolute value is unnecessary depending on the way of setting the threshold values, as explained in the first embodiment.

In the step NS17, differences between the index values are also obtained for the remaining four pairs of fingers 12 (index fingers, middle fingers, ring fingers, and little fingers), through processing similar to that described above for the thumbs.

That is, in the first embodiment, one index value was set for one nail 11, so a single difference between the index values for the nails 11 of the same type fingers 12 on opposite hands was obtained. In contrast, in the second embodiment, index values (right-side index value and left-side index value) are defined for the right and left ends, respectively, of one nail 11, so two differences are obtained from the index values for the nails 11 of a pair of same type fingers 12 on opposite hands.

When the differences between the index values have been obtained, the process proceeds to step T32, where it is determined whether any of the two differences for the index values for the nails 11 of the thumbs of the right and left hands is larger than a prescribed value (threshold value), and if so (Yes in step T32), F flags for the right-side index values and left-side index values for the nails 11 of the thumbs of both hands are set to "1", and the process proceeds to the next step T33.

That is, if the determination result in step T32 is Yes, the F flag for the right-side index value for the nail 11 of the thumb of the right hand, the F flag for the left-side index value for the nail 11 of the thumb of the right hand, the F flag for the right-side index value for the nail 11 of the thumb of the left hand, and the F flag for the left-side index value for the nail 11 of the thumb of the left hand are all set to "1".

Subsequently, in step T33, similar processing as described above for the nails 11 of the thumbs is performed on the nails 11 of the index fingers. In step T34, the similar processing is performed on the nails 11 of the middle fingers. In step T35, the similar processing is performed on the nails 11 of the ring fingers. In step T36, the similar processing is performed on the nails 11 of the little fingers.

It should be noted that the steps T33 through T36 are each identical to the step T32, except that the term "thumbs" in the description of the step T32 is read as the fingers 12 corresponding to the respective steps (for example, in step T33, it is read as "index fingers"). Therefore, the description thereof will be omitted.

When the step T36 is finished, the process returns to the flowchart 5 as the main flow in FIG. 13 again, and proceeds to step NS18.

When the process proceeds to step NS18, the processing shown in the flowchart 8 in FIGS. 17 and 18, as the subroutine corresponding to the step NS18, is started ("START" in the flowchart 8 in FIG. 17).

That is, the processing of comparing, with one another, the right-side index values for the nails 11 of the plurality of fingers 12 of the right hand and obtaining a cost value for the right-side index value for any of the nails 11 of the fingers 12 of the right hand for which it has been determined that the cost value is obtainable is started.

When this processing is started, as shown in FIG. 17, the determination unit 75 compares the right-side index value for the nail 11 of the thumb of the right hand with the right-side index values for the nails 11 of the remaining fingers 12 (index finger, middle finger, ring finger, and little finger) of the right hand, to see whether the right-side index value for the nail 11 of the thumb of the right hand takes a largest value among them. If so (Yes in step T41), the determination unit 75 further refers to the G flag for the left-side index value for the nail 11 of the same type finger on the opposite hand, i.e. the thumb of the left hand. If the G flag for the left-side index value for the nail 11 of the thumb of the left hand is "1" (Yes in step T411), the determination unit 75 determines that a cost value is obtainable for the right-side index value for the nail 11 of the thumb of the right hand, for which the determination is currently in progress, and causes the cost value calculating unit 77 to obtain the cost value (step T412).

When it is determined that a cost value is obtainable, the cost value calculating unit 77 obtains a cost value for the right-side index value for the nail 11 of the thumb of the right hand, for which it has been determined that the cost value is obtainable, by subtracting the right-side index value for the nail 11 of the thumb of the right hand, for which it has been determined that the cost value is obtainable, from the left-side index value for the nail 11 of the same type finger 12 on the opposite hand, i.e. the thumb of the left hand, the left-side index value for which has been determined that it can be regarded as a reliable value.

The cost value calculating unit 77 then sets the obtained cost value as the cost value for the right-side index value for the nail 11 of the thumb of the right hand, for which it has been determined that the cost value is obtainable.

On the other hand, if the reliability of the left-side index value for the nail 11 of the thumb of the left hand is not high, i.e. the G flag is not "1" (No in step T411), the determination unit 75 refrains from determining that a cost value can be obtained for the right-side index value for the nail 11 of the thumb of the right hand, for which the determination is currently in progress, and sets an F flag, indicating the presence/absence of need for re-measurement of the curved shape, for the right-side index value for the nail 11 of the thumb of the right hand to "1" (step T413), indicating that there is a need to re-measure the curved shape, so that in later processing, a user will be prompted to perform re-measurement (or confirmed whether to perform the re-measurement). The process then proceeds to the processing for the nail 11 of a next finger 12 (step T42).

When the process proceeds to step T42, the determination unit 75 performs processing on the right-side index value for the nail 11 of the little finger of the right hand, as in the case of the right-side index value for the nail 11 of the thumb of the right hand described above. Specifically, the determination unit 75 compares the right-side index value for the nail 11 of the little finger of the right hand with the right-side index values for the nails 11 of the remaining fingers of the right hand. If the right-side index value for the nail 11 of the little finger of the right hand takes a smallest value among them (Yes in step T42), the determination unit 75 further confirms whether it has been determined that the left-side index value for the nail 11 of the same type finger 12 on the opposite hand, i.e. the nail 11 of the little finger of the left hand, can be regarded as a reliable value (step T421). If the G flag for the left-side index value for the nail 11 of the little finger of the left hand is "1", meaning that it has been determined that the left-side index value for the nail 11 of the little finger of the left hand can be regarded as a reliable value (Yes in step T421), the determination unit 75 determines that a cost value is obtainable for the right-side index value for the nail 11 of the little finger of the right hand, for which the determination is currently in progress, and causes the cost value calculating unit 77 to obtain the cost value (step T422).

Specifically, as in the above-described case of the right-side index value for the nail 11 of the thumb of the right hand, the cost value calculating unit 77 obtains a cost value for the right-side index value for the nail 11 of the little finger of the right hand, for which it has been determined that the cost value is obtainable, by subtracting the right-side index value for the nail 11 of the little finger of the right hand, for which it has been determined that the cost value is obtainable, from the left-side index value for the nail 11 of the same type finger 12 on the opposite hand, i.e. the nail 11 of the little finger of the left hand, the left-side index value for which has been determined that it can be regarded as a reliable value. The cost value calculating unit 77 then sets the obtained cost value as the cost value for the right-side index value for the nail 11 of the little finger of the right hand, for which it has been determined that the cost value is obtainable.

On the other hand, again as in the above-described case, if the reliability of the left-side index value for the nail 11 of the little finger of the left hand is not high, i.e. the G flag is not "1" (No in step T421), the determination unit 75 refrains from determining that a cost value can be obtained for the right-side index value for the nail 11 of the little finger of the right hand, for which the determination is currently in progress, and sets an F flag, indicating the presence/absence of need for re-measurement of the curved shape, for the right-side index value for the nail 11 of the little finger of the right hand to "1" (step T423), indicating that there is a need to re-measure the curved shape, so that in later processing, a user will be prompted to perform re-measurement (or confirmed whether to perform the re-measurement). The process then proceeds to the processing for the nail 11 of a next finger 12 (step T43).

When the process proceeds to step T43, the determination unit 75 performs processing on the right-side index value for the nail 11 of the index finger of the right hand. Specifically, the determination unit 75 uses a mean and a standard deviation obtained from the right-side index values for the nails 11 of the index finger, middle finger, and ring finger of the right hand, to make a comparison as to whether the right-side index value for the nail 11 of the index finger of the right hand falls within or outside a range of ±standard deviation from the mean. If the right-side index value for the nail 11 of the index finger of the right hand is out of this range (Yes in step T43), it further confirms whether it has been determined that the left-side index value for the nail 11 of the same type finger 12 on the opposite hand, i.e. the nail 11 of the index finger of the left hand, can be regarded as a reliable value (step TS431).

If the G flag for the left-side index value for the nail 11 of the index finger of the left hand is "1", meaning that it has been determined that the left-side index value for the nail 11 of the index finger of the left hand can be regarded as a reliable value (Yes in step T431), the determination unit 75 determines that a cost value is obtainable for the right-side index value for the nail 11 of the index finger of the right hand, for which the determination is currently in progress, and causes the cost value calculating unit 77 to obtain the cost value (step T432).

Specifically, as in the above-described case, the cost value calculating unit 77 obtains a cost value for the right-side index value for the nail 11 of the index finger of the right hand, for which it has been determined that the cost value is obtainable, by subtracting the right-side index value for the nail 11 of the index finger of the right hand, for which it has been determined that the cost value is obtainable, from the left-side index value for the nail 11 of the same type finger 12 on the opposite hand, i.e. the nail 11 of the index finger of the left hand, the left-side index value for which has been determined that it can be regarded as a reliable value. The cost value calculating unit 77 then sets the obtained cost value as the cost value for the right-side index value for the nail 11 of the index finger of the right hand, for which it has been determined that the cost value is obtainable.

On the other hand, again as in the above-described case, if the reliability of the left-side index value for the nail 11 of the index finger of the left hand is not high, i.e. the G flag is not "1" (No in step T431), the determination unit 75 refrains from determining that a cost value can be obtained for the right-side index value for the nail 11 of the index finger of the right hand, for which the determination is currently in progress, and sets an F flag, indicating the presence/absence of need for re-measurement of the curved shape, for the right-side index value for the nail 11 of the index finger of the right hand to "1" (step T433), indicating that there is a need to re-measure the curved shape, so that in later processing, a user will be prompted to perform re-measurement (or confirmed whether to perform the re-measurement). The process then proceeds to the processing for the nail 11 of a next finger 12 (step T44).

It should be noted that the processing (steps T44, T441, T442, T443) regarding the right-side index value for the nail 11 of the middle finger of the right hand and the processing (steps T45, T451, T452, T453) regarding the right-side index value for the nail 11 of the ring finger of the right hand are basically the same as the processing (steps T43, T431, T432, T433) regarding the right-side index value for the nail 11 of the index finger of the right hand described above. That is, the processing (steps T44, T441, T442, T443) regarding the right-side index value for the nail 11 of the middle finger of the right hand is as described above for the processing (steps T43, T431, T432, T433) regarding the right-side index value for the nail 11 of the index finger of the right hand, except that the term "index finger" in the description is read as "middle finger". Similarly, the processing (steps T45, T451, T452, T453) regarding the right-side index value for the nail 11 of the ring finger of the right hand is as described above for the processing (steps T43, T431, T432, T433) regarding the right-side index value for the nail 11 of the index finger of the right hand, except that the term "index finger" in the description is read as "ring finger". Therefore, the description thereof will be omitted.

When the processing in step NS18 is finished, the process proceeds to step NS19 next. In this step NS19, processing similar to that performed in step NS18 on the right-side index values for the nails 11 of the fingers 12 of the right hand is performed on the left-side index values for the nails 11 of the fingers 12 of the right hand. Therefore, the step NS19 is as described above for the step NS18, except that the terms "right-side index value(s)" and "left-side index value(s)" in the description are read as "left-side index value(s)" and "right-side index value(s)", respectively. Thus, the description thereof will be omitted.

When the processing in step NS19 is finished, the process proceeds to step NS20 next. In this step NS20, processing similar to that performed in step NS18 on the right-side index values for the nails 11 of the fingers 12 of the right hand is performed on the right-side index values for the nails 11 of the fingers 12 of the left hand. Therefore, the step NS20 is as described above for the step NS18, except that the description of the nails 11 of the fingers 12 (thumb, index finger, middle finger, ring finger, and little finger) of the right hand is read as the description of the nails 11 of the fingers 12 (thumb, index finger, middle finger, ring finger, and little finger) of the left hand, and that the description of the nails 11 of the fingers 12 (thumb, index finger, middle finger, ring finger, and little finger) of the left hand is read as the description of the nails 11 of the fingers 12 (thumb, index finger, middle finger, ring finger, and little finger) of the right hand. Thus, the description thereof will be omitted.

When the processing in step NS20 is finished, the process proceeds to step NS21 next. In this step NS21, processing similar to that performed in step NS18 on the right-side index values for the nails 11 of the fingers 12 of the right hand is performed on the left-side index values for the nails 11 of the fingers 12 of the left hand. Therefore, the step NS21 is as described above for the step NS18, except that the terms "right" and "left" in the description are read as "left" and "right", respectively. Thus, the description thereof will be omitted.

When the processing in step NS21 is finished, the process proceeds to step NS22 shown in FIG. 14

By the processing up to the step NS21, the F flag has been set to "1" for any of the right-side index values and the left-side index values, among those for the nails 11 of a plurality of, for example five (in total, ten), fingers 12 of the right and left hands, that corresponds to the end of a nail 11 the curved shape of which should presumably be re-measured.

Thus, next, the reacquisition confirmation unit 79 (see FIG. 3) confirms whether there is a nail 11 for which the F flag is "1" for at least one of the right-side index value and the left-side index value, among the nails 11 of the plurality of, for example five (in total, ten), fingers 12 of the right and left hands (step NS22). If there is a nail 11 with the F flag="1" (Yes in step NS22), an image of the hand fingers is displayed, with the nail 11 with the F flag="1" being distinguishably displayed in prescribed color, to confirm whether a user wishes to re-measure the curved shape of the nail 11 with the F flag="1" displayed in the prescribed color (step NS23).

Next, the reacquisition confirmation unit 79 determines whether the re-measurement has been selected (step NS24).

That is, when the user operates the operation unit 22 (see FIG. 1) to select re-measurement, the reacquisition confirmation unit 79 detects that the re-measurement has been selected (Yes in step NS24), and sets a re-measurement flag to the nail 11 with the F flag="1". In the case where a cost value has been set for the right-side index value and/or the left-side index value for this nail 11, the setting of the cost value that becomes unnecessary as a result of the re-measurement is deleted (step NS25), and the process proceeds to the next step NS26.

On the other hand, if there is no nail 11 with the F flag="1" among the nails 11 of the plurality of, for example five (in total, ten), fingers 12 of the right and left hands, or, if no right-side index value and no left-side index value of all the nails 11 have the F flag="1" (No in step NS22), the process proceeds to step NS26, with the steps NS23, NS24, and NS25 being skipped. The process also proceeds to step NS26 in the case where the re-measurement was not selected (No in step NS24).

When the process proceeds to step NS26, the correction confirmation unit 78 (see FIG. 3) confirms whether a cost value has been set for any of the right-side index values and the left-side index values for the nails 11 of the plurality of, for example five (in total, ten), fingers 12 of the right and left hands. If there is a nail 11 for which a cost value has been set for the right-side index value and/or the left-side index value for that nail 11 (Yes in step NS26), an image of the hand fingers is displayed, with the nail 11 for which the cost value has been set being distinguishably displayed in prescribed color, to confirm whether a user wants automatic correction to be done according to the cost value, on the right-side index value and/or the left-side index value for the nail 11 having the cost value set therefor and displayed in the prescribed color (step NS27).

Next, the correction confirmation unit 78 determines whether the automatic correction has been selected (step NS28).

That is, when the user operates the operation unit 22 (see FIG. 1) to select automatic correction, the correction confirmation unit 78 detects that the automatic correction has been selected (Yes in step NS28), and corrects the index value (right-side index value and/or left-side index value) for the nail 11 for which the cost value has been set, in accordance with the cost value (step NS29). The control unit 71a then regards the index value corrected by the correction confirmation unit 78 as a reliable value.

Specifically, for example in the case where a cost value A has been set for a right-side index value, a correction value $\Delta$ for the right-side index value is obtained by multiplying the cost value A by a constant f ($0<f\leq 1$), and this correction value $\Delta$ is added to the right-side index value X for the nail 11 for which the cost value A has been set, to thereby obtain an automatically corrected right-side index value Y ($Y=X+\Delta=X+A\times f$).

The case of a left-side index value is similar to the case of the right-side index value. In the case where a cost value A has been set for a left-side index value, a correction value $\Delta$ for the left-side index value is obtained by multiplying the cost value A by a constant f ($0<f\leq 1$), and this correction value $\Delta$ is added to the left-side index value X for the nail 11 for which the cost value A has been set, to thereby obtain an automatically corrected left-side index value Y ($Y=X+\Delta=X+A\times f$).

On the other hand, if the automatic correction was not selected (No in step NS28), there is a possibility that the user wants to perform re-measurement on the nail 11 for which the cost value has been set. Thus, the reacquisition confirmation unit 79 confirms whether the user wants to re-measure the curved shape of the nail 11 for which the cost value has been set and which is currently displayed in the prescribed color as a result of the step NS27 (step NS30).

Next, the reacquisition confirmation unit 79 determines whether the re-measurement has been selected (step NS31).

That is, when the user operates the operation unit 22 (see FIG. 1) to select re-measurement, the reacquisition confirmation unit 79 detects that the re-measurement has been selected (Yes in step NS31), and sets a re-measurement flag to the nail 11 for which the cost value has been set (step NS32). The process then proceeds to the next step NS33.

The process also proceeds to step NS33 in the case where it is determined in step NS26 that there is no nail 11 for which a cost value has been set for the right-side index value and/or the left-side index value (No in step NS26), and in the case where the re-measurement was not selected (No in step NS31).

Then, in step NS33, the shape acquiring unit 73 confirms whether there is any nail 11 to which a re-measurement flag has been set, among the nails 11 of the plurality of, for example five (in total, ten), fingers 12 of the right and left hands. If there is a nail 11 to which the re-measurement flag has been set (Yes in step NS33), the shape acquiring unit 73 issues an instruction for re-measurement to the user and performs re-measurement of the curved shape of the nail 11. Further, the index value acquiring unit 74 acquires a right-side index value and a left-side index value corresponding to the curved shape of the ends of the nail 11 from the re-measured curved shape of the nail 11 (step NS34). The control unit 71a then regards the acquired right-side index value and left-side index value to be reliable values, and a series of processing is finished.

If there is no nail 11 to which a re-measurement flag has been set (No in step NS33), the series of processing is finished, with the step NS34 being skipped.

When the series of processing is finished (END), the processing of forming a nail design on a nail 11 is started, as described above.

While the present invention has been described above on the basis of the specific embodiments, the present invention is not limited to those embodiments.

For example, in the above embodiments, the re-measurement of the curved shape of a nail is performed only once, in consideration of the low probability that the measurement of the curved shape of a nail is not right. However, it may be configured such that the flow starts from the beginning again after the data on the curved shape of a nail is newly acquired through the re-measurement.

As described above, the present invention is not limited to the above embodiments; rather, modifications and improvements not deviating from its technical ideas are included in the technical scope of the invention.

What is claimed is:

1. A nail shape acquiring device comprising:
a processor configured to:
acquire a plurality of index values each representing a degree of a curve of a curved shape of a nail of a respective one of a plurality of objects based on at least one image in which the plurality of objects are imaged, the plurality of objects being a plurality of fingers including at least one pair of a same type fingers on a right hand and a left hand of one user or a plurality of toes including at least one pair of a same type toes on a right foot and a left foot of one user;
compare an absolute value of a difference between the index values for the nails of the same type fingers on the right hand and left hand or the same type toes on the right foot and left foot with a threshold value;
determine that it is necessary to reacquire at least one of the index values between which the difference exists in a case where the absolute value of the difference is larger than the threshold value; and
determine that it is not necessary to reacquire at least one of the index values between which the difference exists, and use at least one of the index values from the difference calculation as a value representing the degree of the curve of the curved shape of the nail corresponding to said at least one of the index values, in a case where the absolute value of the difference is equal to or smaller than the threshold value.

2. The nail shape acquiring device according to claim 1, wherein the processor is further configured to acquire a maximum value of a height from both ends in the width direction of the nail and a length in the width direction of the nail, and
   wherein the index value is a value obtained by dividing the maximum value of the height of the nail by the length in the width direction of the nail.

3. The nail shape acquiring device according to claim 2, wherein the maximum value of the height from both ends in the width direction of the nail and the length in the width direction of the nail are acquired at a position where the length in the width direction of the nail is greatest.

4. The nail shape acquiring device according to claim 1, wherein the processor is further configured to confirm whether a user wishes to reacquire said at least one of the index values for the nails of the same type fingers on the right hand and left hand or the same type toes on the right foot and left foot in a case where the processor determines that said at least one of the index values is not to be used as a value representing the degree of the curve of the curved shape of the nail, and
   wherein the processes uses said at least one of the index values having been reacquired, as the value representing the degree of the curve of the curved shape of the nail, in a case where said at least one of the index values is reacquired.

5. The nail shape acquiring device according to claim 1, wherein the processor is further configured to:
   acquire, as the index values, a right-side index value representing a degree of inclination toward a left side from a right end in the width direction of the nail, and a left-side index value representing a degree of inclination toward a right side from a left end in the width direction of the nail, and
   acquire, as differences, a first difference indicating a difference between the right-side index value for the nail of one of the same type fingers on the right hand and left hand and the left-side index value for the nail of the other of the same type fingers on the right hand and left hand or a difference between the right-side index value for the nail of one of the same type toes on the right foot and left foot and the left-side index value for the nail of the other of the same type toes on the right foot and left foot, and a second difference indicating a difference between the left-side index value for the nail of the one of the same type fingers on the right hand and left hand and the right-side index value for the nail of the other of the same type fingers on the right hand and left hand or a difference between the left-side index value for the nail of the one of the same type toes on the right foot and left foot and the right-side index value for the nail of the other of the same type toes on the right foot and left foot.

6. A nail shape acquiring device comprising:
   a processor configured to:
      acquire a plurality of index values each representing a degree of a curve of a curved shape of a nail of a respective one of a plurality of objects based on at least one image in which the plurality of objects are imaged, each of the plurality of objects being one of a right hand having plural fingers, a left hand having plural fingers, a right foot having plural toes, and a left foot having plural toes;
      compare an absolute value of a difference between the index values for the nails of same type fingers on the right hand and left hand or same type toes on the right foot and left foot with a threshold value;
      determine that it is necessary to reacquire at least one of the index values between which the difference exists in a case where the absolute value of the difference is larger than the threshold value; and
      determine that it is not necessary to reacquire at least one of the index values between which the difference exists, and use at least one of the index values from the difference calculation as a value representing the degree of the curve of the curved shape of the nail corresponding to said at least one of the index values, in a case where the absolute value of the difference is equal to or smaller than the threshold value.

7. The nail shape acquiring device according to claim 6, wherein the processor is further configured to acquire a maximum value of a height from both ends in the width direction of the nail and a length in the width direction of the nail, and
   wherein the index value is a value obtained by dividing the maximum value of the height of the nail by the length in the width direction of the nail.

8. The nail shape acquiring device according to claim 7, wherein the maximum value of the height from both ends in the width direction of the nail and the length in the width direction of the nail are acquired at a position where the length in the width direction of the nail is greatest.

9. The nail shape acquiring device according to claim 6, wherein the processor is further configured to confirm whether a user wishes to reacquire said at least one of the index values for the nails of the same type fingers on the right hand and left hand or the same type toes on the right foot and left foot, in a case where it is determined that said at least one of the index values is not to be used as a value representing the degree of the curve of the curved shape of the nail.

10. A drawing apparatus comprising:
   a nail shape acquiring device;
   a printer which performs drawing on nails; and
   a processor which controls the printer to draw,
   wherein the processor is configured to:
      acquire a plurality of index values each representing a degree of a curve of a curved shape of a nail of a respective one of a plurality of objects based on at least one image in which the plurality of objects are imaged, the plurality of objects being a plurality of fingers including at least one pair of a same type fingers on a right hand and a left hand of one user or a plurality of toes including at least one pair of a same type toes on a right foot and a left foot of one user;
      compare an absolute value of a difference between the index values for the nails of the same type fingers on the right hand and left hand or the same type toes on the right foot and left foot with a threshold value;
      determine that it is necessary to reacquire at least one of the index values between which the difference exists in a case where the absolute value of the difference is larger than the threshold value; and
      determine that it is not necessary to reacquire at least one of the index values between which the difference exists, and use at least one of the index values from the difference calculation as a value representing the degree of the curve of the curved shape of the nail corresponding to said at least one of the index values, in a case where the absolute value of the difference is equal to or smaller than the threshold value.

11. A method for controlling a nail shape acquiring device, the method comprising:

acquiring a plurality of index values each representing a degree of a curve of a curved shape of a nail of a respective one of a plurality of objects based on at least one image in which the plurality of objects are imaged, the plurality of objects being a plurality of fingers including at least one pair of a same type fingers on a right hand and a left hand of one user or a plurality of toes including at least one pair of a same type toes on a right foot and a left foot of one user;

comparing an absolute value of a difference between the index values for the nails of the same type fingers on the right hand and left hand or the same type toes on the right foot and left foot with a threshold value;

determining that it is necessary to reacquire at least one of the index values between which the difference exists in a case where the absolute value of the difference is larger than the threshold value; and determining that it is not necessary to reacquire at least one of the index values between which the difference exists, and using at least one of the index values from the difference calculation as a value representing the degree of the curve of the curved shape of the nail corresponding to said at least one of the index values, in a case where the absolute value of the difference is equal to or smaller than the threshold value.

12. A method for controlling a nail shape acquiring device, the method comprising:

acquiring a plurality of index values each representing a degree of a curve of a curved shape of a nail of a respective one of a plurality of objects based on at least one image in which the plurality of objects are imaged, each of the plurality of objects being one of a right hand having plural fingers, a left hand having plural fingers, a right foot having plural toes, and a left foot having plural toes;

comparing an absolute value of a difference between the index values for the nails of same type fingers on the right hand and left hand or same type toes on the right foot and left foot with a threshold value;

determining that it is necessary to reacquire at least one of the index values between which the difference exists in a case where the absolute value of the difference is larger than the threshold value; and determining that it is not necessary to reacquire at least one of the index values between which the difference exists, and using at least one of the index values from the difference calculation as a value representing the degree of the curve of the curved shape of the nail corresponding to said at least one of the index values, in a case where the absolute value of the difference is equal to or smaller than the threshold value.

13. A non-transitory computer-readable recording medium storing a program for controlling a nail shape acquiring device, the control program causing a computer to perform processes comprising:

acquiring a plurality of index values each representing a degree of a curve of a curved shape of a nail of a respective one of a plurality of objects based on at least one image in which the plurality of objects are imaged, the plurality of objects being a plurality of fingers including at least one pair of a same type fingers on a right hand and a left hand of one user or a plurality of toes including at least one pair of a same type toes on a right foot and a left foot of one user;

comparing an absolute value of a difference between the index values for the nails of the same type fingers on the right hand and left hand or the same type toes on the right foot and left foot with a threshold value;

determining that it is necessary to reacquire at least one of the index values between which the difference exists in a case where the absolute value of the difference is larger than the threshold value; and determining that it is not necessary to reacquire at least one of the index values between which the difference exists, and using at least one of the index values from the difference calculation as a value representing the degree of the curve of the curved shape of the nail corresponding to said at least one of the index values, in a case where the absolute value of the difference is equal to or smaller than the threshold value.

14. A non-transitory computer-readable recording medium storing a program for controlling a nail shape acquiring device, the control program causing a computer to perform processes comprising:

acquiring a plurality of index values each representing a degree of a curve of a curved shape of a nail of a respective one of a plurality of objects based on at least one image in which the plurality of objects are imaged, each of the plurality of objects being one of a right hand having plural fingers, a left hand having plural fingers, a right foot having plural toes, and a left foot having plural toes;

comparing an absolute value of a difference between the index values for the nails of same type fingers on the right hand and left hand or same type toes on the right foot and left foot with a threshold value;

determining that it is necessary to reacquire at least one of the index values between which the difference exists in a case where the absolute value of the difference is larger than the threshold value; and determining that it is not necessary to reacquire at least one of the index values between which the difference exists, and using at least one of the index values from the difference calculation as a value representing the degree of the curve of the curved shape of the nail corresponding to said at least one of the index values, in a case where the absolute value of the difference is equal to or smaller than the threshold value.

15. A drawing apparatus comprising:

a nail shape acquiring device;

a printer which performs drawing on nails; and a processor which controls the printer to draw, wherein the processor is configured to:

acquire a plurality of index values each representing a degree of a curve of a curved shape of a nail of a respective one of a plurality of objects based on at least one image in which the plurality of objects are imaged, each of the plurality of objects being one of a right hand having plural fingers, a left hand having plural fingers, a right foot having plural toes, and a left foot having plural toes;

compare an absolute value of a difference between the index values for the nails of same type fingers on the right hand and left hand or same type toes on the right foot and left foot with a threshold value;

determine that it is necessary to reacquire at least one of the index values between which the difference exists in a case where the absolute value of the difference is larger than the threshold value; and determine that it is not necessary to reacquire at least one of the index values between which the difference exists, and use at least one of the index values from the difference calculation as a value representing the degree of the curve of the curved shape of the nail corresponding to said at least one of the index values, in a case where the absolute value of the difference is equal to or smaller than the threshold value.

* * * * *